US012616899B2

(12) United States Patent
Kitano et al.

(10) Patent No.: US 12,616,899 B2
(45) Date of Patent: May 5, 2026

(54) INFORMATION PROCESSING APPARATUS, INFORMATION PROCESSING SYSTEM, AND INFORMATION PROCESSING METHOD

(71) Applicant: Sony Group Corporation, Tokyo (JP)

(72) Inventors: Hiroaki Kitano, Saitama (JP); Michael Siegfried Spranger, Tokyo (JP); Masahiro Fujita, Saitama (JP)

(73) Assignee: SONY GROUP CORPORATION, Tokyo (JP)

( * ) Notice: Subject to any disclaimer, the term of this patent is extended or adjusted under 35 U.S.C. 154(b) by 197 days.

(21) Appl. No.: 18/281,885

(22) PCT Filed: Feb. 24, 2022

(86) PCT No.: PCT/JP2022/007502
§ 371 (c)(1),
(2) Date: Sep. 13, 2023

(87) PCT Pub. No.: WO2022/209450
PCT Pub. Date: Oct. 6, 2022

(65) Prior Publication Data
US 2024/0165514 A1      May 23, 2024

(30) Foreign Application Priority Data
Mar. 30, 2021     (JP) ................................. 2021-057039

(51) Int. Cl.
*G06T 13/40* (2011.01)
*A63F 13/358* (2014.01)
*A63F 13/56* (2014.01)

(52) U.S. Cl.
CPC ............ *A63F 13/56* (2014.09); *A63F 13/358* (2014.09); *G06T 13/40* (2013.01)

(58) Field of Classification Search
CPC ......... G06T 19/006; G06T 7/00; G06T 13/40; A63F 13/56; A63F 13/358
See application file for complete search history.

(56) References Cited

U.S. PATENT DOCUMENTS

2016/0250559 A1* 9/2016 Sogabe ................. A63F 13/577
463/3

FOREIGN PATENT DOCUMENTS

| CN | 109529355 A | 3/2019 |
| JP | 2003-006127 A | 1/2003 |

(Continued)

OTHER PUBLICATIONS

Ivan Vaghi, et al, "Coping with inconsistency due to network delays in collaborative virtual environments", VRST Jan. 1999. Proceedings of the ACM Symposium on Virtual Reality Software and Technology, Dec. 20-22, 1999, London, UK, pp. 42-49, XP058358646.

*Primary Examiner* — Antonio A Caschera
(74) *Attorney, Agent, or Firm* — Paratus Law Group, PLLC

(57) ABSTRACT

An information processing apparatus according to an embodiment includes: a control unit (101) that controls display of a first virtual space, in which the control unit controls a motion of an avatar corresponding to a second operator displayed in the first virtual space on a basis of prediction information for predicting an operation by the second operator with respect to a second virtual space different from the first virtual space, the second virtual space corresponding to the second operator.

13 Claims, 19 Drawing Sheets

(56)           References Cited

FOREIGN PATENT DOCUMENTS

JP        2010-172732  A      8/2010
JP        2020-009295  A      1/2020
WO    WO 2014/208606  A1    12/2014
WO      WO-2018081605  A1  *   5/2018

* cited by examiner

Figure 2:
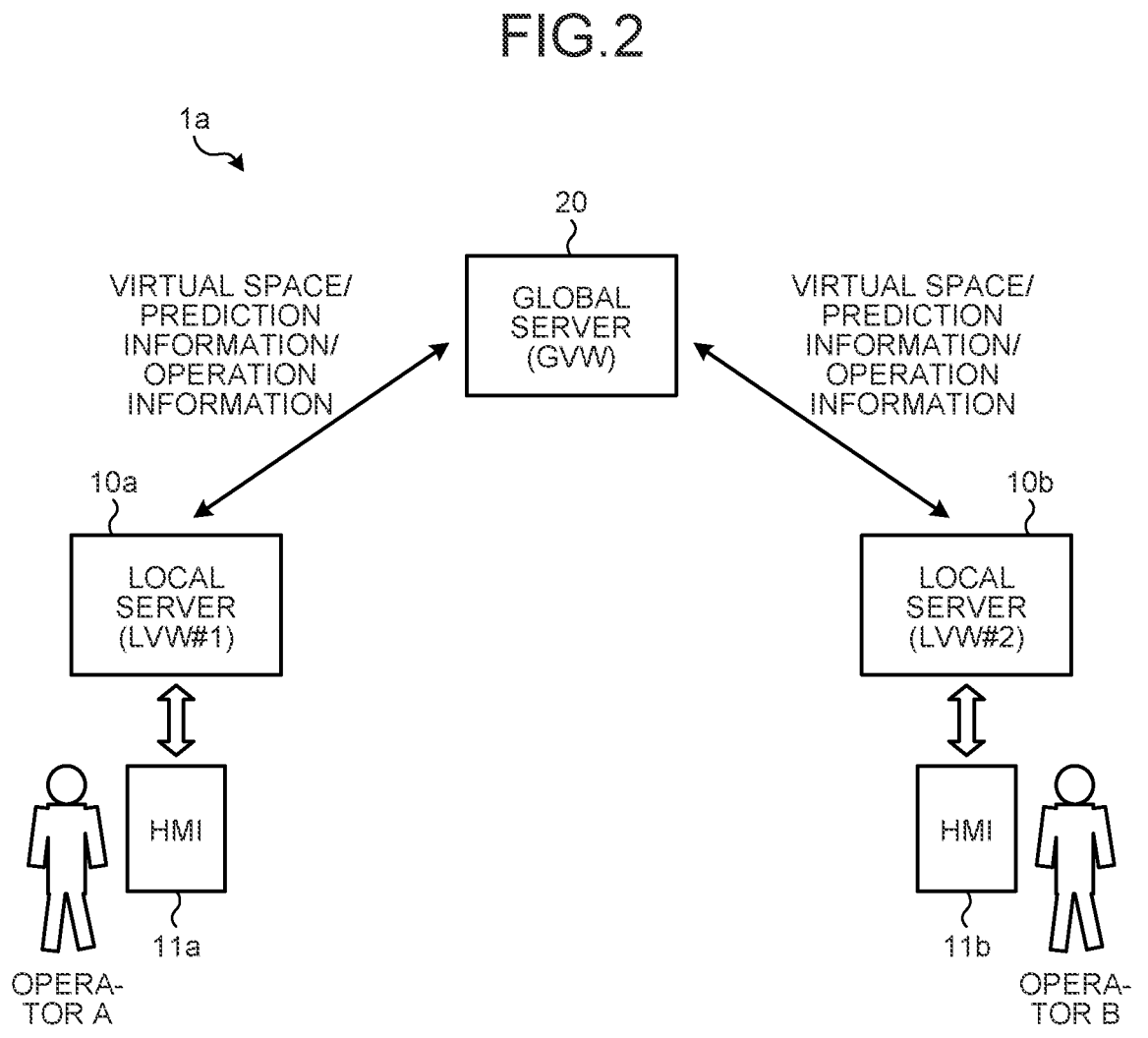

GLOBAL
SERVER
(GVW)

VIRTUAL SPACE/
PREDICTION
INFORMATION/
OPERATION
INFORMATION

VIRTUAL SPACE/
PREDICTION
INFORMATION/
OPERATION
INFORMATION

10a

LOCAL
SERVER
(LVW#1)

10b

LOCAL
SERVER
(LVW#2)

HMI

11a

HMI

11b

OPERA-
TOR A

OPERA-
TOR B

FIG.10

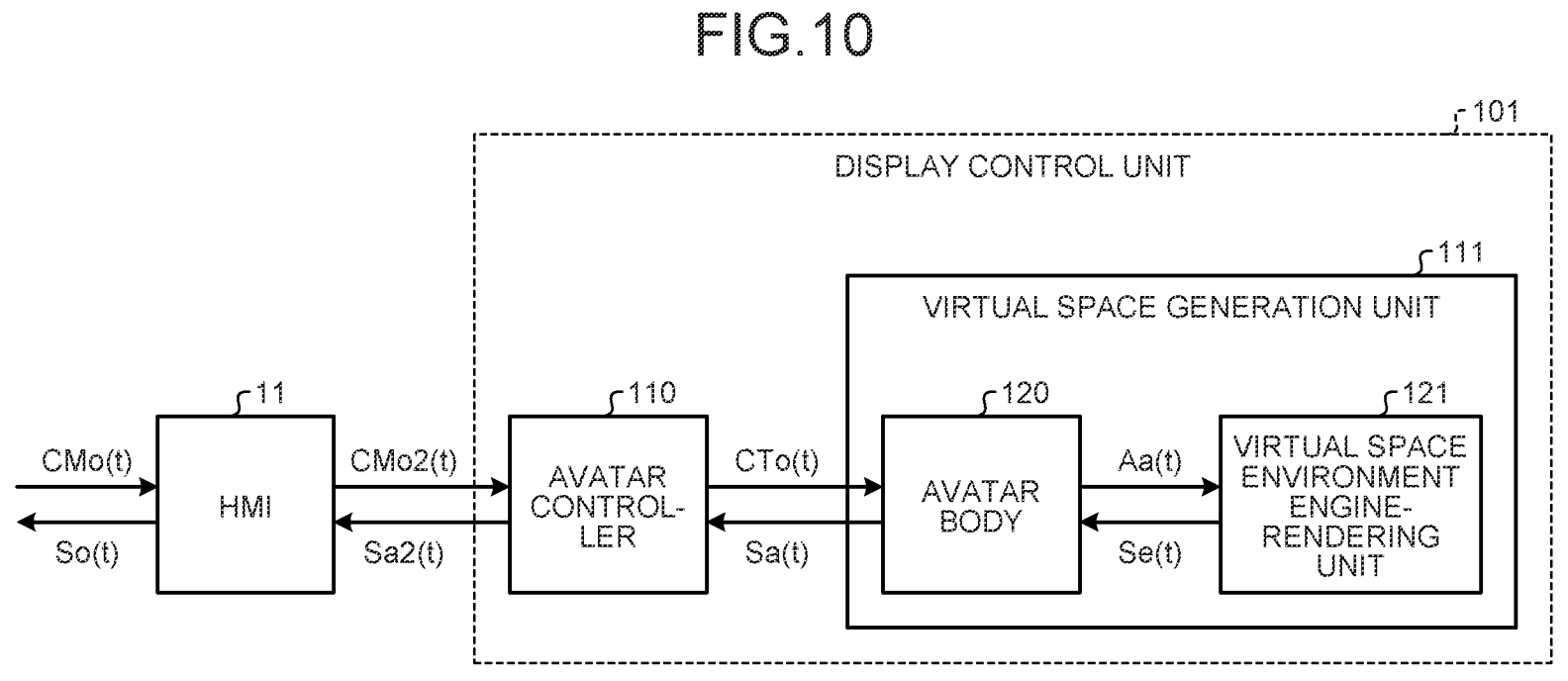

DISPLAY CONTROL UNIT 101

VIRTUAL SPACE GENERATION UNIT 111

AVATAR BODY 120

VIRTUAL SPACE ENVIRONMENT ENGINE-RENDERING UNIT 121

Aa(t)

Se(t)

AVATAR CONTROL-LER 110

CTo(t)

Sa(t)

HMI 11

CMo2(t)

Sa2(t)

CMo(t)

INFORMATION PROCESSING APPARATUS, INFORMATION PROCESSING SYSTEM, AND INFORMATION PROCESSING METHOD

CROSS REFERENCE TO PRIOR APPLICATION

This application is a National Stage Patent Application of PCT International Patent Application No. PCT/JP2022/007502 (filed on Feb. 24, 2022) under 35 U.S.C. § 371, which claims priority to Japanese Patent Application No. 2021-057039 (filed on Mar. 30, 2021), which are all hereby incorporated by reference in their entirety.

FIELD

The present disclosure relates to an information processing apparatus, an information processing system, and an information processing method.

BACKGROUND

In recent years, metaverse, which is a kind of virtual world constructed on a communication network such as the Internet, has attracted attention. A large number of users from various places can participate in the metaverse at the same time, and each user participates in the metaverse using, for example, his or her own avatar. Each user operates an avatar using a controller or the like, so that the user can freely act in the metaverse.

One of the problems in metaverse is a delay when an avatar operated by a user participating from each place interacts with the virtual world or another avatar in the virtual world. Roughly two types of the delay are conceivable, which are a delay that occurs when the user operates the user's own avatar, and a delay until a reaction from the environment in the virtual world or another avatar returns. Conventionally, it has been common to eliminate these delays by reducing communication delays, such as a reduction in the amount of communication by a codec and an appropriate routing setting.

On the other hand, there is disclosed a technique of separating a virtual world into multiple virtual worlds having the same spatial coordinate system, and independently updating each virtual world to suppress occurrence of discrepancies between the respective virtual worlds (for example, Patent Literature 1). Patent Literature 1 proposes a technique of superimposing images of multiple virtual spaces with a delay allowed, so as to eliminate the delay in appearance.

CITATION LIST

Patent Literature

Patent Literature 1: JP 2010-172732 A

SUMMARY

Technical Problem

However, in the virtual world such as a metaverse, for example, a delay related to a user's operation due to a physical distance to the global data center cannot be theoretically avoided. In addition, since there is a delay in the network, the user feels uncomfortable or inconvenient in the interaction operation. Furthermore, Patent Literature 1 rather actively uses a delay, and elimination of the delay is merely an apparent matter.

An object of the present disclosure is to provide an information processing apparatus, an information processing system, and an information processing method capable of eliminating a delay with respect to an operation in a virtual world.

Solution to Problem

For solving the problem described above, an information processing apparatus, according to one aspect of the present disclosure has a control unit that controls display of a first virtual space, wherein the control unit controls a motion of an avatar corresponding to a second operator displayed in the first virtual space on a basis of prediction information for predicting an operation by the second operator with respect to a second virtual space different from the first virtual space, the second virtual space corresponding to a terminal of the second operator.

BRIEF DESCRIPTION OF DRAWINGS

FIG. 2 is a schematic diagram illustrating a configuration of an example of an information processing system according to a first embodiment of the present disclosure.

FIG. 10 is a block diagram illustrating a configuration of an example for controlling a motion of an avatar according to an operation by an operator according to the first embodiment.

FIG. 11 is a state transition diagram of an example illustrating an example of a state transition applicable to the first embodiment for an avatar controller to control a motion of an avatar body.

FIG. 12 is a schematic diagram for describing control of an avatar according to the first embodiment.

FIG. 13 is a schematic diagram for describing prediction processing according to the first embodiment.

FIG. 16 is a diagram for describing a first example of a method for resolving a contradiction according to the first embodiment.

FIG. 18 is a schematic diagram illustrating a configuration of an example of an information processing system according to a second embodiment.

DESCRIPTION OF EMBODIMENTS

Figure 1:
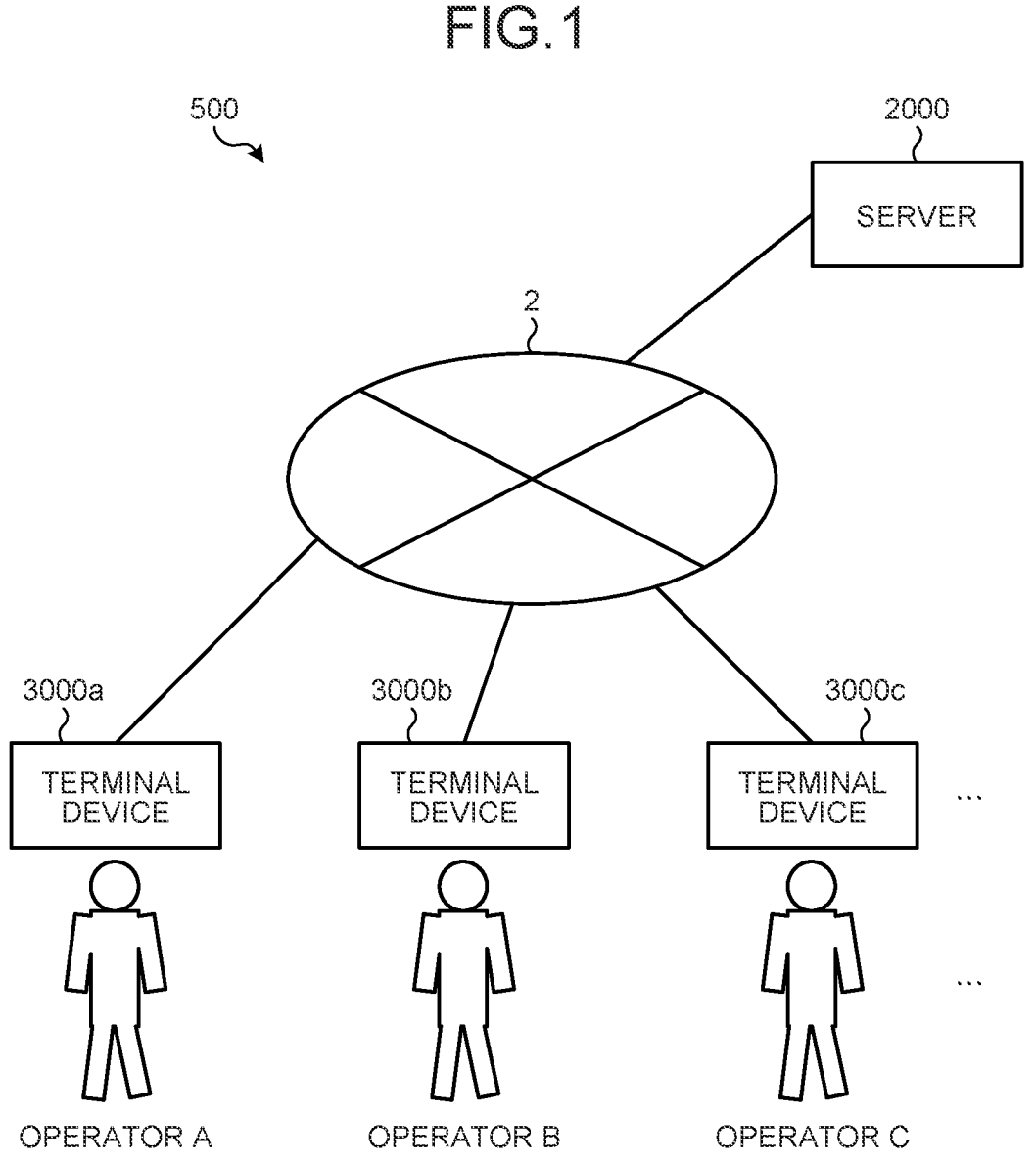
FIG. 1 is a schematic diagram illustrating a configuration of an example of an information processing system for achieving a metaverse according to an existing technology.

Hereinafter, embodiments of the present disclosure will be described in detail with reference to the drawings. Note that, in the following embodiment, the same parts are denoted by the same reference numerals, and redundant description is omitted.

Hereinafter, embodiments of the present disclosure will be described in the following order.

1. Outline of metaverse
2. First embodiment of present disclosure
2-1. Configuration according to first embodiment
2-2. Processing according to first embodiment
2-3. Details of configuration according to first embodiment
2-4. Prediction processing according to first embodiment
2-5. Resolution of contradiction according to first embodiment
3. Second embodiment of present disclosure
4. Third embodiment of present disclosure

1. Outline of Metaverse

First, prior to the description of an embodiment of the present disclosure, the metaverse will be schematically described for the sake of easy understanding.

FIG. 1 is a schematic diagram illustrating a configuration of an example of an information processing system for achieving metaverse according to an existing technology. In FIG. 1, an information processing system 500 includes a server 2000 connected to network 2 such as the Internet, and terminal devices 3000a, 3000b, 3000c, . . . . The terminal devices 3000a, 3000b, 3000c, . . . are operated by an operator A, an operator B, an operator C, . . . , respectively.

The server 2000 generates a virtual world by the virtual space and presents the generated virtual world to each terminal device 3000a, 3000b, 3000c, . . . via the network 2. Furthermore, the virtual world generated by the server 2000 includes avatars A, B, C, . . . that are substitutes in the virtual world of the operators A, B, C, . . . , respectively.

Each of the operators A, B, C, . . . can observe the virtual world and the avatars A, B, C, . . . in the virtual world by a display device connected to or built in each of the terminal devices 3000a, 3000b, 3000c, . . . . Furthermore, for example, the operator A can operate his or her own avatar A in the virtual world by inputting a command to an input device connected to or incorporated in the terminal device 3000a by a predetermined method. Similarly, the operators B, C, . . . can operate their own avatars C, B in the virtual world, respectively.

For example, the operator A can observe the virtual world presented by the server 2000 by the display device of the terminal device 3000a operated by the operator A. Furthermore, for example, the operator A can observe the avatars B, C, . . . of the operators B, C, . . . in addition to the own avatar A in the virtual world. Furthermore, for example, by operating the avatar A, the operator A can cause the motion of the avatar A to act on the motions of the respective avatars B, C, . . . of the other operators B, C, . . . .

As described above, in the metaverse, it is possible to cause the motions of the avatars A, B, C, . . . to act on each other's motions in the same virtual world according to the operation by each of the plurality of operators A, B, C, . . . operating the different terminal devices 3000a, 3000b, 3000c. Thus, each of the operators A, B, C, . . . can enjoy a feeling as if they are directly communicating in the same virtual world, for example.

In the information processing system 500 described above, it is conceivable that the server 2000 and each of the terminal devices 3000a, 3000b, 3000c, . . . and further the terminal devices 3000a, 3000b, 3000c, . . . are placed in locations remote from each other. As an example, the server 2000 is installed on the U.S. west coast, and the operator A accesses the virtual space by the server 2000 from Japan and the operator B accesses it from the U.S. east coast.

In such a case, a delay occurs when the avatars A, B, C, . . . operated by the operators A, B, C, . . . participating from various places interact with the virtual world or another avatar in the virtual world. This delay may impair the reality of the virtual world for the respective operators A, B, C, . . . and may cause contradiction between the motions of the respective avatars A, B, C, . . . operated by the respective operators A, B, C, . . . .

Roughly two types of the delay are conceivable, which are a delay that occurs when the user operates the user's own avatar, and a delay until a reaction from the environment in the virtual world or another avatar returns. Conventionally, it has been common to eliminate these delays by reducing communication delays, such as a reduction in the amount of communication by a codec and an appropriate routing setting.

On the other hand, Patent Literature 1 discloses a technique of separating a virtual world into multiple virtual worlds having the same spatial coordinate system, and independently updating each virtual world to suppress occurrence of discrepancies between the respective virtual worlds. Patent Literature 1 proposes a technique of superimposing images of multiple virtual spaces with a delay allowed, so as to eliminate the delay in appearance. According to Patent Literature 1, rather, the delay is actively used, and the cancellation of the delay is merely apparent.

In the information processing system according to the present disclosure, each server (local server) corresponding to each of the terminal devices 3000a, 3000b, 3000c, . . . is provided at a distance physically close to each of the terminal devices 3000a, 3000b, 3000c, . . . . Each of the terminal devices 3000a, 3000b, 3000c, . . . may have a function of a local server. Each local server presents the virtual space to the corresponding terminal device among the terminal devices 3000a, 3000b, 3000c, . . . . Moreover, in the information processing system according to the present disclosure, in each local server, the motion of each avatar operated in each terminal device other than the terminal device in the virtual space presented to the corresponding terminal device is predicted.

Therefore, the information processing system according to the present disclosure can distribute the calculation resources of the virtual space and reduce the delay in communication. Furthermore, the information processing system according to the present disclosure can eliminate a delay until a reaction from the environment in the virtual world or another avatar to the operation by the operator returns.

2. First Embodiment of Present Disclosure

Next, a first embodiment of the present disclosure will be described.

2-1. Configuration According to First Embodiment

FIG. 2 is a schematic diagram illustrating a configuration of an example of the information processing system according to the first embodiment of the present disclosure. In FIG. 2, an information processing system 1a according to the first embodiment of the present disclosure includes a plurality of local servers 10a and 10b and a global server 20. Each of the local servers 10a and 10b communicates with the global server 20 via a network (not illustrated) such as the Internet.

Note that, in FIG. 2, the local servers 10a and 10b are also illustrated as LVW (local virtual world) #1 and LVW #2, respectively. Similarly, in FIG. 2, the global server 20 is also illustrated as a global virtual world (GVW). Furthermore, in FIG. 2, the information processing system 1a is illustrated to include two local servers 10a and 10b, but this is an example for description, and the information processing system 1a may include three or more local servers.

A human machine interface (HMI) 11a used by the operator A is communicably connected to the local server 10a. Similarly, the HMI 11b used by the operator B is communicably connected to the local server 10b. The HMI 11a includes a display device that displays an image for the operator A and an input device with which input of a command corresponding to an operation by the operator A is performed. Similarly, the HMI 11b includes a display device that displays an image for the operator B and an input device with which input of a command corresponding to an operation by the operator B is performed.

The global server 20 constructs a common global virtual world for each of the local servers 10a and 10b and presents it to each of the local servers 10a and 10b. Hereinafter, the virtual world constructed by the global server 20 is appropriately referred to as a global virtual world (GVW). The GVW includes virtual structures, objects, and avatars operated by operators.

The local servers 10a and 10b each receive information regarding the GVW from the global server 20, and construct a virtual world including structures, objects, and avatars that are the same as structures, objects, and avatars included in the GVW. The virtual world constructed by the local server is appropriately referred to as a local virtual world (LVW). In FIG. 2, LVWs generated by the local servers 10a and 10b are referred to as LVW #1 (first virtual space) and LVW #12, respectively.

Here, the information transferred from the global server 20 to each of the local servers 10a and 10b is basically prediction information. The local servers 10a and 10b construct and draw the LVW #1 and the LVW #2, respectively, on the basis of initial values of the virtual space transferred from the global server 20 in advance and the prediction information.

More specifically, for example, the local server 10a transfers, to the global server 20, operation information that is input to the HMI 11a by the operator A and indicates an operation on, for example, the avatar A that is a proxy of the operator A in the virtual world. Furthermore, the local server 10a predicts, for example, a motion of the avatar B that is a proxy of the operator B in the virtual world by the operator B, and transfers prediction information to the global server 20. The local server 10a transfers the operation information and the prediction information to the global server 20. At this time, the local server 10a adds a flag indicating that the operator A has performed an operation to the operation information, and transfers the operation information to the global server 20. The local server 10a may further add a flag indicating that it is prediction information to the prediction information, and transfer the prediction information to the global server 20.

Similarly, the local server 10b transfers the operation information indicating the operation on the avatar B input to the HMI 11b by the operator B and the prediction information predicting the motion of the avatar A to the global server 20. The local server 10b adds a flag indicating that the operator B has performed an operation to the operation information, and transfers the operation information to the global server 20.

The global server 20 detects the presence or absence of contradiction between each piece of operation information and each piece of prediction information on the basis of each piece of the operation information and the prediction information transferred from each of the local servers 10a and 10b and the flag added to the operation information. When a contradiction is detected between each piece of the operation information and each piece of the prediction information, the global server 20 generates a command for resolving the contradiction and transfers the generated command to the local server 10a or 10b as described in detail later.

As described above, in the information processing system 1a according to the first embodiment, calculation resources for the virtual space are distributed to the local server 10a and the local server 10b. At the same time, for example, since the local server 10a is disposed at a physically close distance from the HMI 11a, the operation on the avatar A by the operator A can be caused to act on the LVW #1 with a small latency. Further, since the local server 10a predicts the motion of the avatar B, the motion of the avatar B can be reflected on the HMI 11a with a very small delay.

Hardware Configuration Example According to
First Embodiment

Next, an example of a hardware configuration according to the first embodiment will be described. Note that, in the following description, in a case where it is not necessary to particularly distinguish the local servers 10a and 10b, the local servers 10a and 10b will be described as the local server 10. Similarly, in a case where it is not necessary to particularly distinguish the HMIs 11a and 11b, the HMIs 11a and 11b will be described as the HMI 11.

Figure 3:
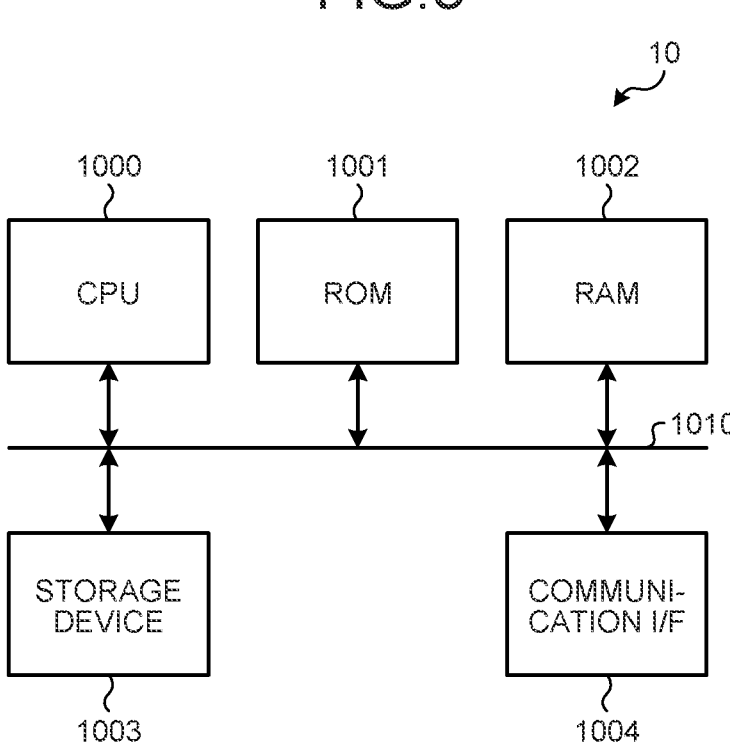
FIG. 3 is a block diagram illustrating a configuration of an example of a local server applicable to the first embodiment.

FIG. 3 is a block diagram illustrating a configuration of an example of the local server 10 applicable to the first embodiment. In FIG. 3, the local server 10 includes a central processing unit (CPU) 1000, a read only memory (ROM) 1001, a random access memory (RAM) 1002, a storage device 1003, and a communication interface (I/F) 1004 communicably connected to each other via a bus 1010.

The storage device 1003 is a nonvolatile storage medium such as a hard disk drive or a flash memory. The CPU 1000 controls the overall operation of the local server 10 by using the RAM 1002 as a work memory according to a program stored in the storage device 1003 and the ROM 1001. The communication I/F 1004 performs communication via the network such as the Internet.

Note that the configuration of the local server 10 is not limited to the example of FIG. 3. For example, in addition to the configuration of FIG. 3, a display, a keyboard, and a pointing device may be connected to the local server 10.

In addition, since the global server 20 can be achieved by the same configuration as the local server 10 in FIG. 3, the description thereof is omitted here. The present invention is not limited thereto, and the global server 20 may be achieved by distributing functions to a plurality of computers, or may be a server on a cloud network.

Figure 4:
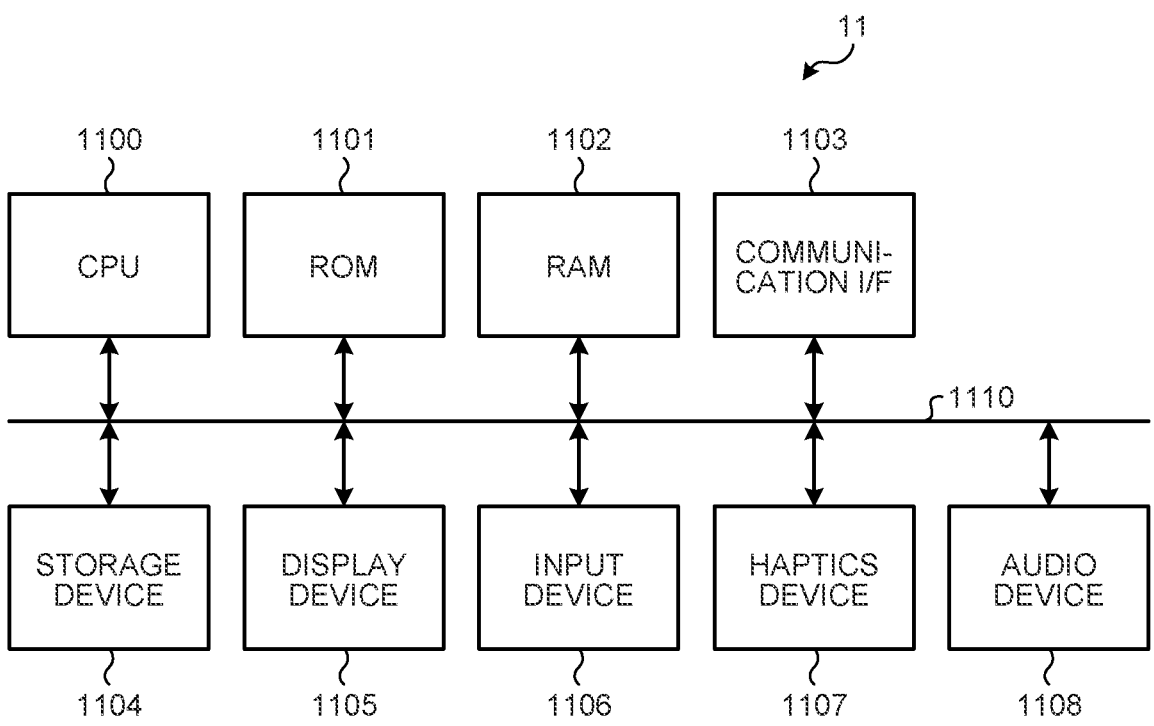
FIG. 4 is a block diagram illustrating a configuration of an example of an HMI applicable to the first embodiment.

FIG. 4 is a block diagram illustrating a configuration of an example of the HMI 11 applicable to the first embodiment. In FIG. 4, the HMI 11 includes a CPU 1100, a ROM 1101, a RAM 1102, a communication I/F 1103, a storage device 1104, a display device 1105, an input device 1106, a haptics device 1107, and an audio device 1108 which are communicably connected to each other by a bus 1110.

The storage device 1104 is a nonvolatile storage medium such as a hard disk drive or a flash memory. The CPU 1100 controls the entire operation of the HMI 11 by using the RAM 1102 as a work memory according to a program stored in the storage device 1104 and the ROM 1201. The communication I/F 1103 performs communication via the network such as the Internet.

The display device 1105 displays a screen according to a display control signal generated by the CPU 1100 according to the program. The display device 1105 may be a general display or a head mounted display (HMD) used by being worn on the head of the user. The input device 1106 receives an operation by a user (operator) and generates an input signal corresponding to the operation. The input signal generated by the input device 1106 is passed to the CPU 1100 via the bus 1110. The haptics device 1107 gives a tactile stimulus to the user, and is, for example, a vibrator that vibrates according to an instruction of the CPU 1100.

The audio device 1108 converts the digital audio signal supplied by the CPU 1100 into an analog audio signal, and outputs the analog audio signal to a sound output device such as a speaker, an earphone, or a headphone. Furthermore, the audio device 1108 converts an analog audio signal collected by the microphone into a digital audio signal, and passes the digital audio signal to the CPU 1100 via the bus 1110, for example.

A general personal computer can be applied as the HMI 11. The present invention is not limited thereto, and a smartphone or a tablet computer can be applied as the HMI 11. Further, the HMI 11 may be configured such that the display device 1105 is an HMD and a predetermined input device 1106 is combined with the HMD. In this case, the input device 1106 may be a controller operated by the user wearing the HMD with a finger or the like, or may detect a line of sight of the user wearing the HMD and generate an input signal according to the direction (position) of the detected line of sight. In addition, the input device 1106 may be built in the HMI 11, or may be configured to be separated from the main body of the HMI 11 and perform wireless communication with the main body of the HMI 11. In addition, the input device 1106 may include the haptics device 1107.

Furthermore, in FIG. 2 described above, the local server 10 and the HMI 11 are illustrated as separate devices, but this is not limited to this example. For example, the HMI 11 may include configurations and functions of the local server 10.

Figure 5:
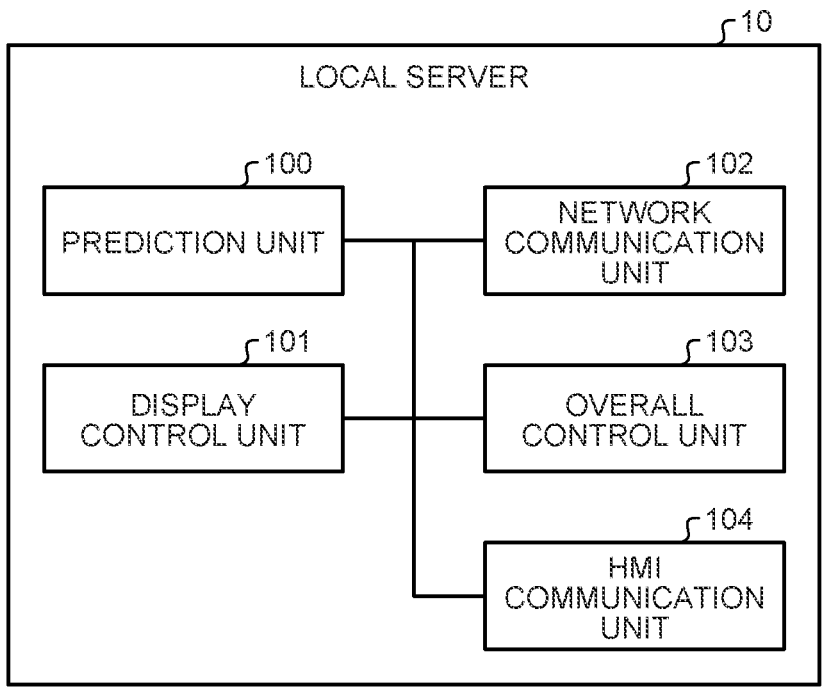
FIG. 5 is a functional block diagram of an example for describing functions of the local server according to the first embodiment.

FIG. 5 is a functional block diagram of an example for describing functions of the local server according to the first embodiment. In FIG. 5, the local server 10 includes a prediction unit 100, a display control unit 101, a network communication unit 102, an overall control unit 103, and an HMI communication unit 104.

The prediction unit 100, the display control unit 101, the network communication unit 102, the overall control unit 103, and the HMI communication unit 104 are configured by executing a predetermined program on the CPU 1000. Not limited to this, part or all of the prediction unit 100, the display control unit 101, the network communication unit 102, the overall control unit 103, and the HMI communication unit 104 may be configured by hardware circuits that operate in cooperation with each other.

The overall control unit 103 controls the overall operation of the local server 10. The network communication unit 102 performs communication via the network such as the Internet. The network communication unit 102 communicates with, for example, the global server 20 via a network. Furthermore, the network communication unit 102 can also communicate with another local server 10 via a network.

The HMI communication unit 104 communicates with the HMI 11. The HMI communication unit 104 acquires, from the HMI 11, an input signal corresponding to an operation of the HMI 11 on the input device 1106. Further, the HMI communication unit 104 transfers a display control signal generated by the display control unit 101 to be described later to the HMI 11. The HMI 11 displays a screen on the display device 1105 in accordance with the display control signal transferred from the HMI communication unit 104.

The prediction unit 100 predicts the motion of the avatar operated with the HMI 11 connected to another local server 10. Although details will be described later, for example, the prediction unit 100 acquires, from the HMI communication unit 104, an input signal corresponding to an operation on the input device 1106 of the HMI 11. Further, the prediction unit 100 acquires information from the avatar operated by the HMI 11 in the LVW #1 presented by the local server 10. The prediction unit 100 predicts the motion of the avatar operated with the HMI 11 connected to another local server 10 on the basis of the acquired information.

The display control unit 101 generates display control information for displaying a screen on the display device 1105 of the HMI 11. For example, the display control unit 101 uses information of the virtual space environment acquired from the global server 20 at a predetermined timing as initial values, draws the virtual world according to the input signal acquired from the HMI 11, and generates a display control signal for displaying the drawn screen.

Note that, in the above description, the local server 10 and the HMI 11 have been described to have a one-to-one relationship, but this is not limited to this example. For example, the local server 10 as the hardware described with reference to FIG. 3 can be connected to the plurality of HMIs 11, and can individually provide the function illustrated in FIG. 5 to each of the plurality of connected HMIs 11.

In the local server 10, by executing a predetermined program, the CPU 1000 configures each of the prediction unit 100, the display control unit 101, the network communication unit 102, the overall control unit 103, and the HMI communication unit 104 described above on a main storage area in the RAM 1002, for example, as a module.

The program can be acquired from the outside (for example, a server device) via a network such as a LAN or the Internet by communication via the communication I/F 1004, for example, and can be installed on the local server 10. The present invention is not limited thereto, and the program may be provided by being stored in a detachable storage medium such as a compact disk (CD), a digital versatile disk (DVD), or a universal serial bus (USB) memory.

Figure 6:
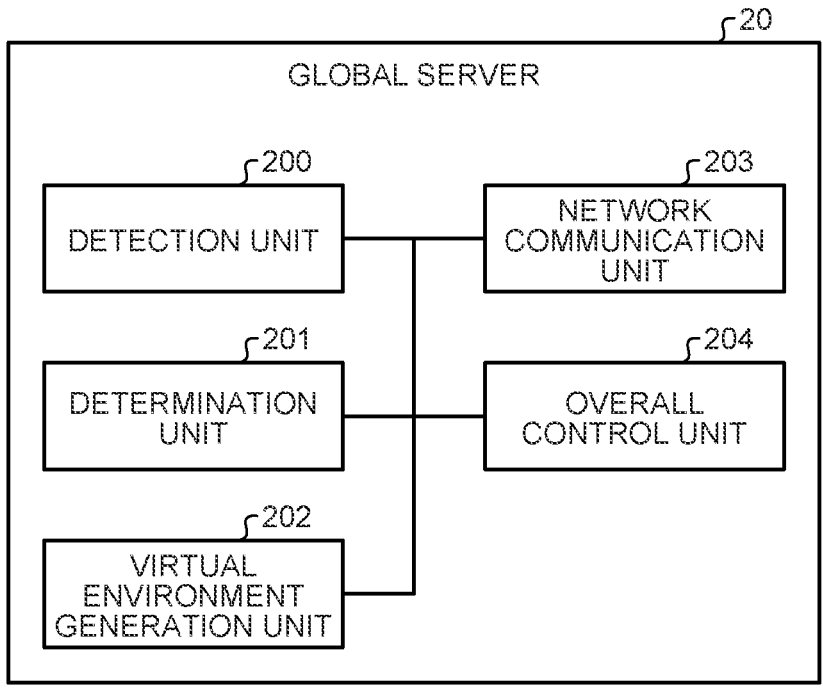
FIG. 6 is a functional block diagram of an example for describing functions of a global server according to the first embodiment.

FIG. 6 is a functional block diagram of an example for describing functions of the global server 20 according to the first embodiment. In FIG. 6, the global server 20 includes a detection unit 200, a determination unit 201, a virtual environment generation unit 202, a network communication unit 203, and an overall control unit 204.

The detection unit 200, the determination unit 201, the virtual environment generation unit 202, the network communication unit 203, and the overall control unit 204 are configured by executing a predetermined program on a CPU, which is not illustrated. Not limited to this, part or all of the detection unit 200, the determination unit 201, the virtual environment generation unit 202, the network communication unit 203, and the overall control unit 204 may be configured by hardware circuits that operate in cooperation with each other.

The overall control unit 204 controls the overall operation of the local server 10. The network communication unit 203 performs communication via the network such as the Internet. The network communication unit 203 communicates with, for example, the local server 10 via a network.

The detection unit 200 detects the presence or absence of contradiction in the motion of each avatar on the basis of the prediction information for predicting the motion of each avatar acquired by the network communication unit 203 from the plurality of local servers 10 and the operation information for operating each avatar. For example, in a case where the motion of another avatar B predicted for the motion of the avatar A operated with the HMI 11 connected to the local server 10 is different from the motion corresponding to the actual motion of the avatar B, the detection unit 200 detects a contradiction in the motion of the avatars A and B. Note that the detection unit 200 can identify the prediction information and the operation information on the basis of the first flag and the second flag.

In a case where the contradiction of the movement between the avatars is detected by the detection unit 200, the determination unit 201 determines an avatar to be given priority of motion among the avatars related to the detected contradiction.

The virtual environment generation unit 202 generates initial values of a virtual environment (GVW) to be presented to each local server 10. The virtual environment generation unit 202 generates initial values of the virtual environment on the basis of, for example, information of virtual structures and objects and avatars operated by operators in each local server 10. The initial values of the virtual environment generated by the virtual environment generation unit 202 are transferred to each local server 10 by the network communication unit 203.

In the global server 20, by executing a predetermined program, the CPU configures each of the detection unit 200, the determination unit 201, the virtual environment generation unit 202, the network communication unit 203, and the overall control unit 204 described above on a main storage area in the RAM, for example, as a module.

The program can be acquired from the outside (for example, a server device) via a network such as a LAN or the Internet by communication via a communication I/F included in the global server 20, for example, and can be installed on the global server 20. The present invention is not limited thereto, and the program may be provided by being stored in a detachable storage medium such as a compact disk (CD), a digital versatile disk (DVD), or a universal serial bus (USB) memory.

2-2. Processing According to First Embodiment

Next, processing according to the first embodiment will be described.

Here, it is assumed that the local servers 10a and 10b are connected to the global server 20. The local server 10a presents the LVW #1 to the HMI 11a, which is not illustrated, and the operator A operates the avatar A in the LVW #1 using the HMI 11a. Similarly, the local server 10b presents the LVW #2 to the HMI 11b, which is not illustrated, and the operator B operates the avatar B in the LVW #2 using the HMI 11b. Further, the avatars A and B are shared by the LVW #1 and the LVW #2.

The operator A interacts with the LVW #1 presented by the local server 10a. For example, the operator A operates the avatar A to pick up an object A in the LVW #1. The operator B also interacts at the LVW #2 in VLW #2 presented by the local server 10b located close to the operator B (HMI 11b). For example, the operator B operates the avatar B to advance the avatar B, for example.

These processes are performed in the respective LVW #1 and LVW #2, and the local servers 10a and 10b update and draw the LVW #1 and the LVW #2, respectively.

The local servers 10a and 10b transmit signals indicating changes in the avatar A and the avatar B, respectively, to the global server 20. In the global server 20, even in the GVW, the avatar A operated by the operator A tries to pick up the object A, and the avatar B operated by the operator B tries to advance in the GVW. That is, in any of the GVW, the LVW #1, and the LVW #12, the avatar A tries to pick up the object A, and the avatar B starts to advance.

Here, a state in which the avatar A tries to pick up the object A and the avatar B starts to advance is set as an initial value.

The local server 10a predicts the state in the LVW #1. Similarly, the local server 10b predicts the state in the LVW #2. The local servers 10a and 10b independently update the LVW #1 and the LVW #2. On the other hand, the operator A interacts with the LVW #1, and the operator B interacts with the LVW #2. In response to the interactions of the operator A and the operator B, the avatar A and the avatar B continue motions.

The local servers 10a and 10b notify the global server 20 of the update in the LVW #1 or VLW #2 by transmitting the prediction information to the global server 20 at each timing. The global server 20 generates prediction information globally and transmits the generated prediction information to the local servers 10a and 10b.

When the states of VLW #1 and VLW #2 change as indicated by the prediction information, the operator A and the operator B can enjoy the interaction in the virtual world without feeling a delay. On the other hand, in a case where the prediction has differed from the change by the actual operation, it is necessary to correct the change and coordinate the entire virtual world.

Figure 7:
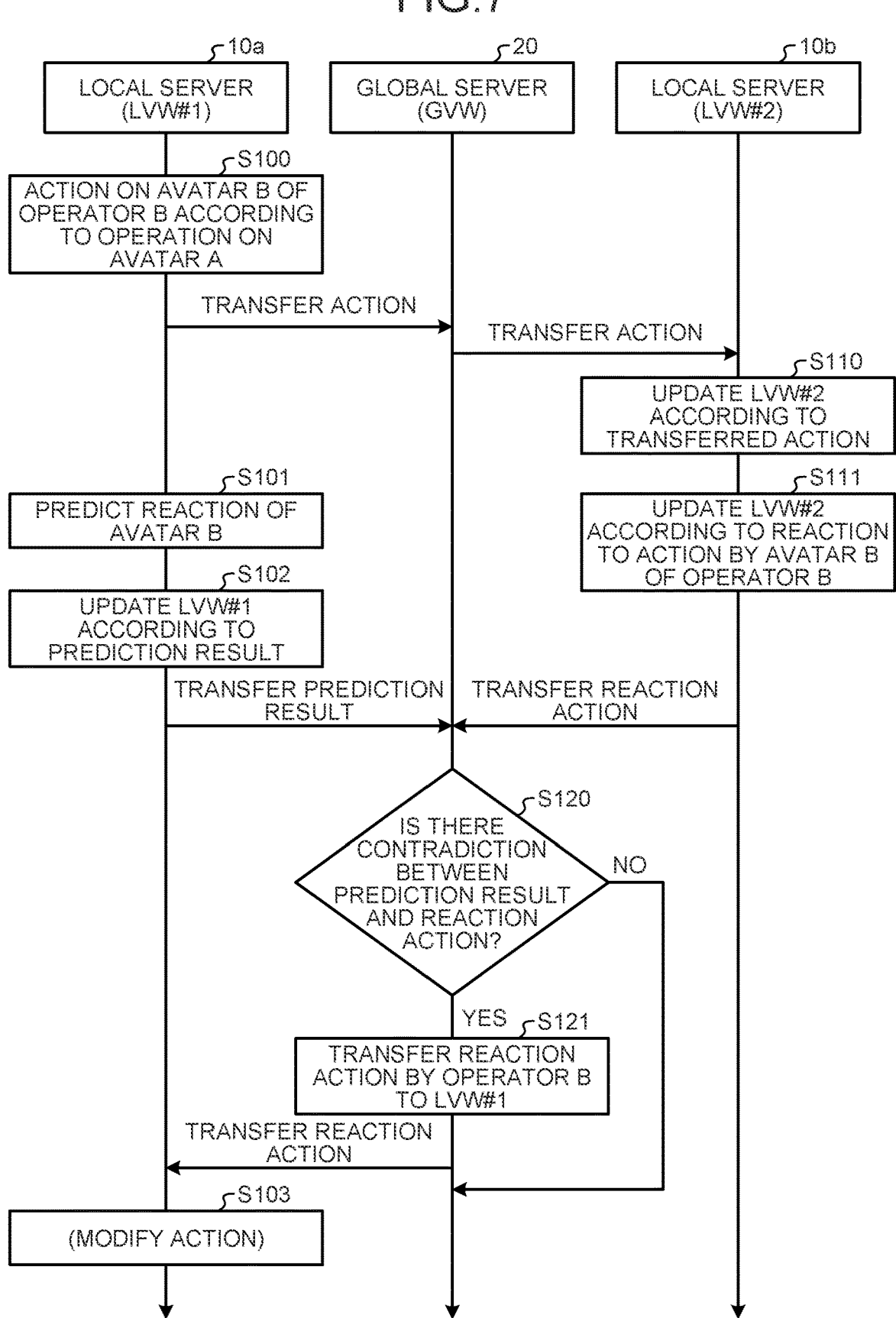
FIG. 7 is a flowchart of an example for schematically describing processing according to the first embodiment.

Next, the processing according to the first embodiment will be described more specifically. FIG. 7 is a flowchart of an example for describing the processing according to the first embodiment. The flowchart of FIG. 7 illustrates an example of an interaction in which the operator A operates the avatar A to generate an action to cause the avatar B operated by the operator B to generate some action corresponding to the action.

In step S100, the local server 10a generates an action on the avatar B of the operator B according to the operation by the operator A on the avatar A. This action is transferred to the local server 10b via the global server 20. The local server 10b receives the transferred action after a certain delay time has elapsed from the occurrence timing of the action in the local server 10a. In step S110, the local server 10b updates the LVW #12 according to the received action notification, and reflects the action in the LVW #2.

In step S101, the local server 10a predicts a reaction of the avatar B to the action generated in step S100. In step S102, the local server 10a updates the LVW #1 based on the prediction result, and reflects the prediction result in the LVW #1. Furthermore, the local server 10a transfers the prediction information indicating the prediction result predicted in step S101 to the global server 20.

On the other hand, in step S111, the local server 10b updates the LVW #2 according to the reaction to the action by the avatar B of the operator B, and transfers a reaction action by the reaction to the global server 20.

In step S120, the global server 20 compares the prediction information transferred from the local server 10a with the reaction action transferred from the local server 10b, and detects the presence or absence of a contradiction between the motion indicated by the prediction information and the motion by the reaction action. In a case where a contradiction is detected (step S120, "Yes"), the global server 20 shifts the processing to step S121.

In step S121, the global server 20 transfers the reaction action of the avatar B by the operator B to the local server 10a (the LVW #1). In other words, the global server 20 prioritizes the action corresponding to the operation by the real world operator B with respect to the action predicted in the virtual world, and employs the action as the action of the avatar B.

Upon receiving the reaction action transferred from the global server 20, the local server 10a may modify, in step S103, the action generated in step S100 in response to the received reaction action.

On the other hand, in a case where no contradiction is detected in step S120 (step S120, "No"), the global server 20 may not perform any processing, for example.

(Prediction of Action of Avatar and Contradiction to Prediction)

Figure 8:
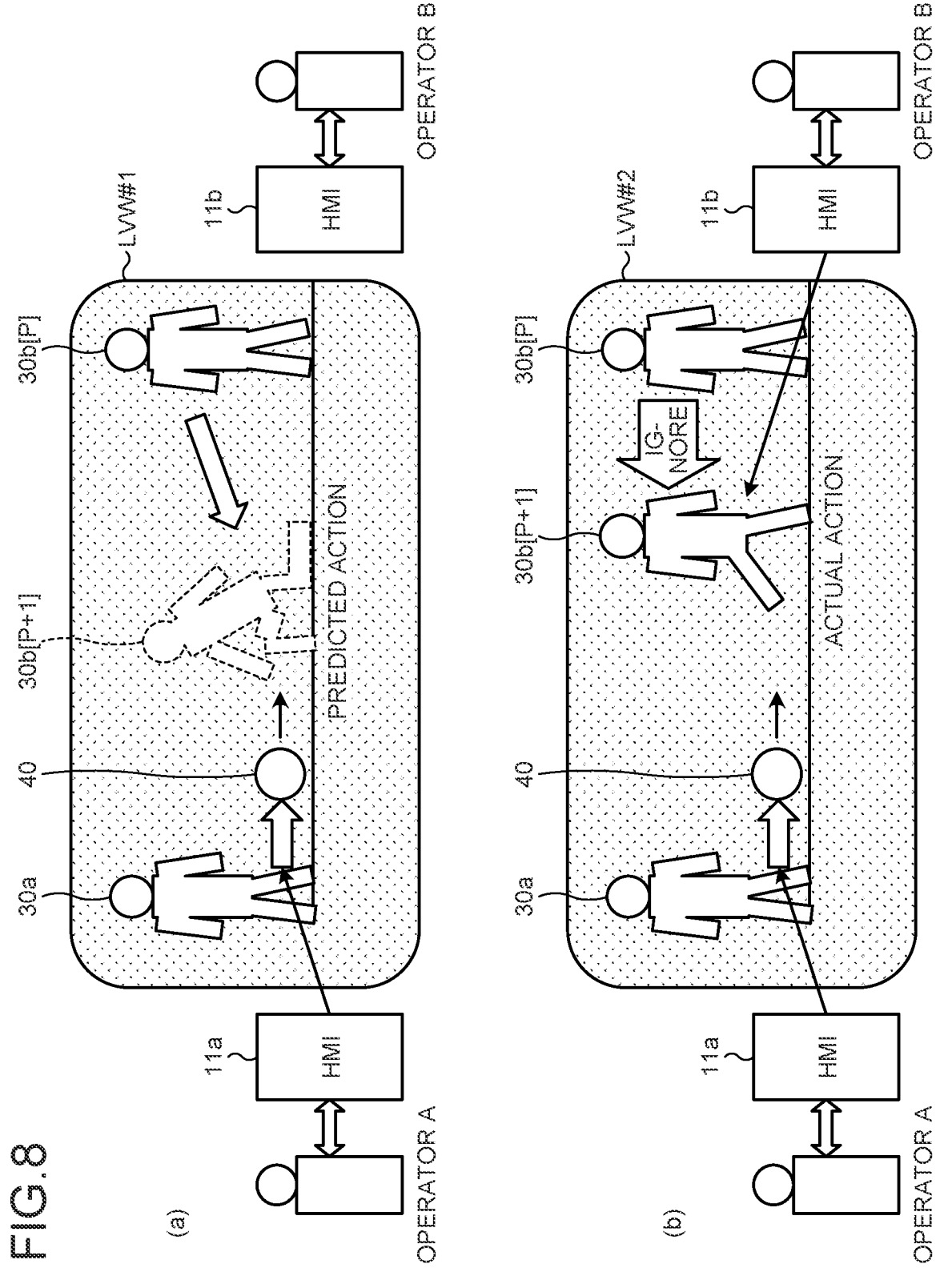
FIG. 8 is a diagram for describing prediction and contradiction with prediction according to the first embodiment.

The processing according to the first embodiment will be described more specifically with reference to FIGS. 8 and 9. FIG. 8 is a diagram for describing prediction and contradiction with prediction according to the first embodiment.

Section (a) in FIG. 8 is a diagram illustrating the action of an avatar 30b operated by the operator B predicted by the local server 10a with respect to the action corresponding to the operation by an avatar 30a by the operator A. First, according to the operation by the operator A on the HMI 11a, the avatar 30a in the LVW #1 starts to roll a ball 40 as a virtual object with respect to the avatar 30b in the LVW #1. The local server 10a predicts that the avatar 30b will pick up the ball 40.

In this case, the action of the avatar 30b predicted by the local server 10a is, for example, an action in which an avatar 30b[P] at a certain time[P] attempts to catch the ball 40 by squatting at a time[P+1] after the time[P], as illustrated in an avatar 30b[P+1].

Actions of the avatar 30a and the ball 40 are also presented on the local server 10b at the LVW #2. It is assumed that, for example, the operator B causes the avatar 30b to perform an action of ignoring the ball 40 and letting it pass by operating the HMI 11b. Section (b) in FIG. 8 illustrates an example of the action of the avatar 30b in this case. For example, with respect to the avatar 30b[P] at the time[P], the operator B generates an action of not picking up the ball 40 and letting it pass as indicated by the avatar 30b[P+1] at the time[P+1].

In this case, there is a contradiction between the prediction for the action of the avatar 30b in the local server 10a illustrated in section (a) of FIG. 8 and the actual action of the avatar 30b corresponding to the operation by the operator B illustrated in section (b) of FIG. 8.

Figure 9:
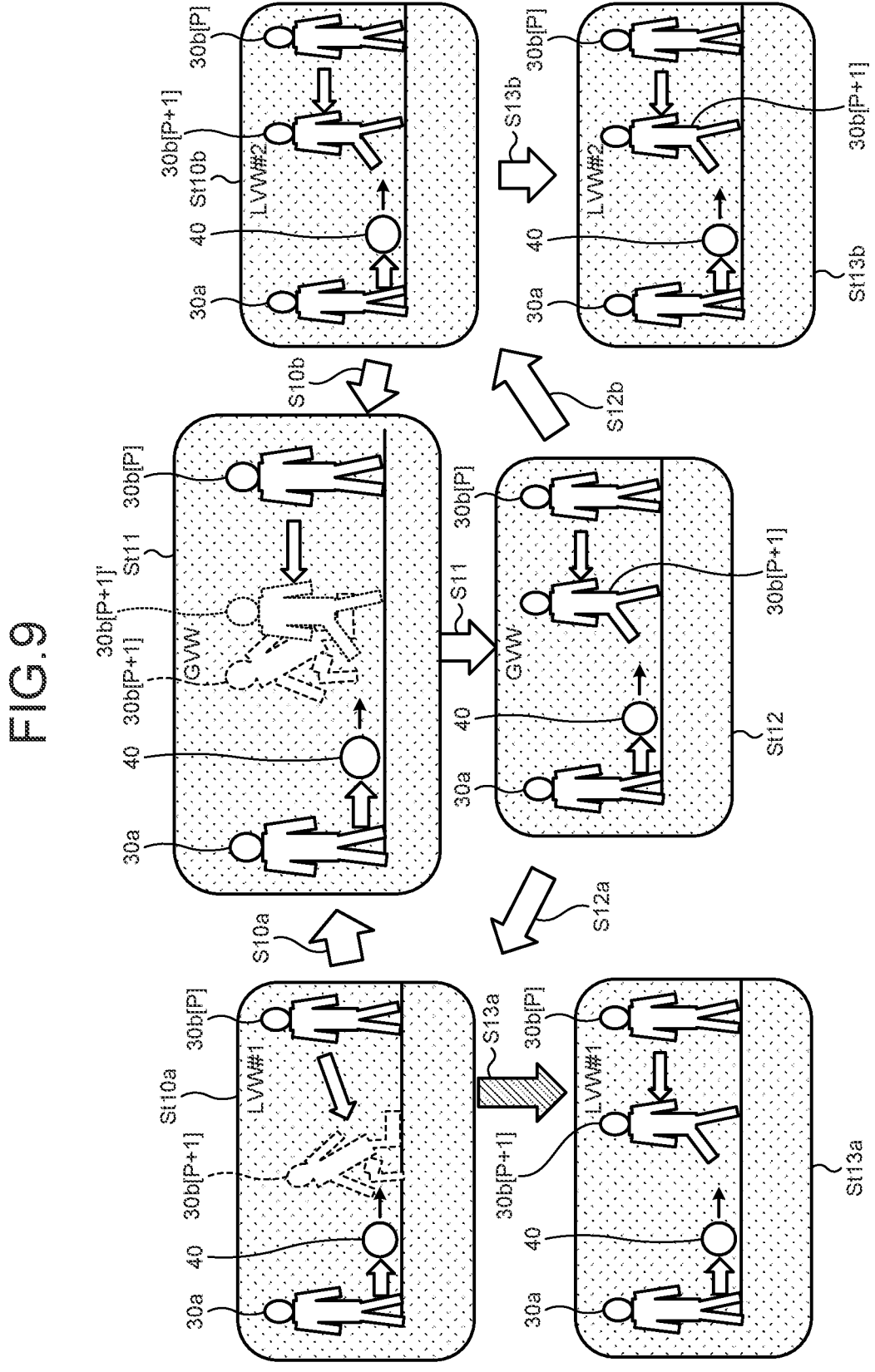
FIG. 9 is a diagram for describing processing for solving a contradiction between prediction and an actual action according to the first embodiment.

FIG. 9 is a diagram for describing processing for solving a contradiction between prediction and an actual action according to the first embodiment. In FIG. 9, a state St10a illustrated in the upper left corresponds to the above-described section (a) of FIG. 8. That is, in the state St10a, the local server 10a predicts that the avatar 30b will generate an action of "picking up the ball 40", as illustrated as the avatar 30b[P+1], for the action of "starting to roll the ball 40" of the avatar 30a in the LVW #1 (step S101 in FIG. 7).

On the other hand, in FIG. 9, a state St10b illustrated in the upper right corresponds to the above-described section (b) of FIG. 8. That is, in the state St10b, the local server 10b generates a reaction action of "letting the ball 40 pass" with respect to the avatar 30b as illustrated as the avatar 30b[P] and the avatar 30b[P+1] in the LVW #2 according to the operation by the operator B (step S111 in FIG. 7).

The local server 10a transmits prediction information predicting the action of the avatar 30b in the state St10a to the global server 20 (step S10a). On the other hand, the local server 10b transmits the reaction action of the avatar 30b corresponding to the operation by the operator B in the state St10b to the global server 20 (step S10b).

In the global server 20, in the state St11, a contradiction between the action of the avatar 30b predicted by the local server 10a and the reaction action of the avatar 30b corresponding to the operation by the operator B in the real world is detected on the basis of the prediction information and the reaction action ("Yes" in step S120 in FIG. 7). When a contradiction between the prediction information and the reaction action is detected, the global server 20 prioritizes the action corresponding to the operation by the real world operator B with respect to the action predicted in the virtual world, and employs the action as the action of the avatar 30b as illustrated in the state St12 (step S11, step S121 in FIG. 7).

The global server 20 notifies the local server 10a of the employment result of the action of the avatar 30b (step S12a). As illustrated as a state St13a, the local server 10a replaces the action of the avatar 30b by prediction in the LVW #1 with an action to reflect the employment result according to the notified employment result (step S13a). That is, the local server 10a replaces the action of the avatar 30b in the LVW #1 with the action of "picking up the ball 40" with the action of "letting the ball 40 pass", as indicated by state St13a.

Furthermore, the global server 20 notifies the local server 10b of the employment result (step S12b). Since the employment result is the action of the avatar 30b corresponding to the operation by the operator B in the LVW #2, the local server 10b continues the motion up to immediately before, for example (step S13b). The state St13b after step S13b corresponds to the immediately preceding state St10b.

2-3. Details of Configuration According to First Embodiment

Next, the configuration according to the first embodiment will be described in more detail. FIG. 10 is a block diagram illustrating a configuration of an example for controlling the motion of the avatar according to the operation by the operator according to the first embodiment. Here, the description will be given assuming that the motion of the avatar corresponding to the operation by the operator using the HMI 11 is controlled by the display control unit 101 in the local server 10. The present invention is not limited thereto, and the control of the motion may be performed by, for example, the overall control unit 103 in the local server 10.

In FIG. 10, the display control unit 101 includes an avatar controller 110 and a virtual space generation unit 111. Furthermore, the virtual space generation unit 111 includes an avatar body 120 and a virtual space environment engine-rendering unit 121.

The operator inputs a command CMo(t) to the HMI 11 and receives a command So(t). The command So(t) is presented in various forms such as visual, auditory, and tactile feedback to the operator. According to the command So(t), for example, the operator can observe the video of the virtual world as a three-dimensional (3D) video having three-dimensional information by the display device 1105 (display or HMD) as a video viewed from the viewpoint of the avatar. In addition, the operator can similarly receive a sound image in the virtual world as a 3D sound image by a sound output device such as a speaker, a headphone, or an earphone according to the command So(t). The operator can also receive tactile sensation as vibration of the controller or force from the exoskeleton by the haptics device 1107 according to the command So(t).

The HMI 11 converts the command CMo(t) into a command CMo2($t$) to the avatar controller 110, for example, the HMI 11 converts the command CMo(t) into an advance command, a kick-ball command, or the like for the avatar according to the content thereof. The avatar controller 110 converts the command CMo2($t$) into a command CTo(t) that instructs a specific motion on the avatar body 120. The command CTo(t) is, for example, a command to move the limbs of the avatar body 120. The avatar body 120 moves a limb or the like in response to the command CTo(t), which is converted into a command Aa(t) indicating a force acting on the virtual space, and performs an actual motion in the virtual space.

In the virtual space, the action of the avatar body 120 causes the ball to roll or the object to move. In the virtual space, an action such as standing or advancing of the avatar itself is also performed. The virtual space environment engine-rendering unit 121 draws the virtual space and causes the motion of the avatar to act on the virtual space via physical simulation.

The virtual space environment engine-rendering unit 121 expresses the environment of the entire virtual space as a command Se(t). The virtual space environment engine-rendering unit 121 converts the command Se(t) into a command Sa(t) related only to the avatar body 120 and passes the command to the avatar body 120. For example, in the virtual space, various changes occur even where the change is not related to the avatar body 120, but information regarding the change not related to the avatar body 120 is not given to the avatar body 120, and the change related to the avatar body 120 is given to the avatar body 120 as the command Sa(t).

The command Sa(t) detected by the avatar body 120 is converted by the avatar controller 110 into a command Sa2($t$) at the viewpoint of the avatar body 120 or at the point of the auditory sensor. In other words, the command Sa2($t$) can be said to be a command based on the environment information in the LVW #1. The HMI 11 converts the command Sa2($t$) into the command So(t), and presents an image, a sound image, a tactile sense, and the like to the operator via the display device 1105, the haptics device 1107, and the audio device 1108 according to the command So(t).

Figure 11:
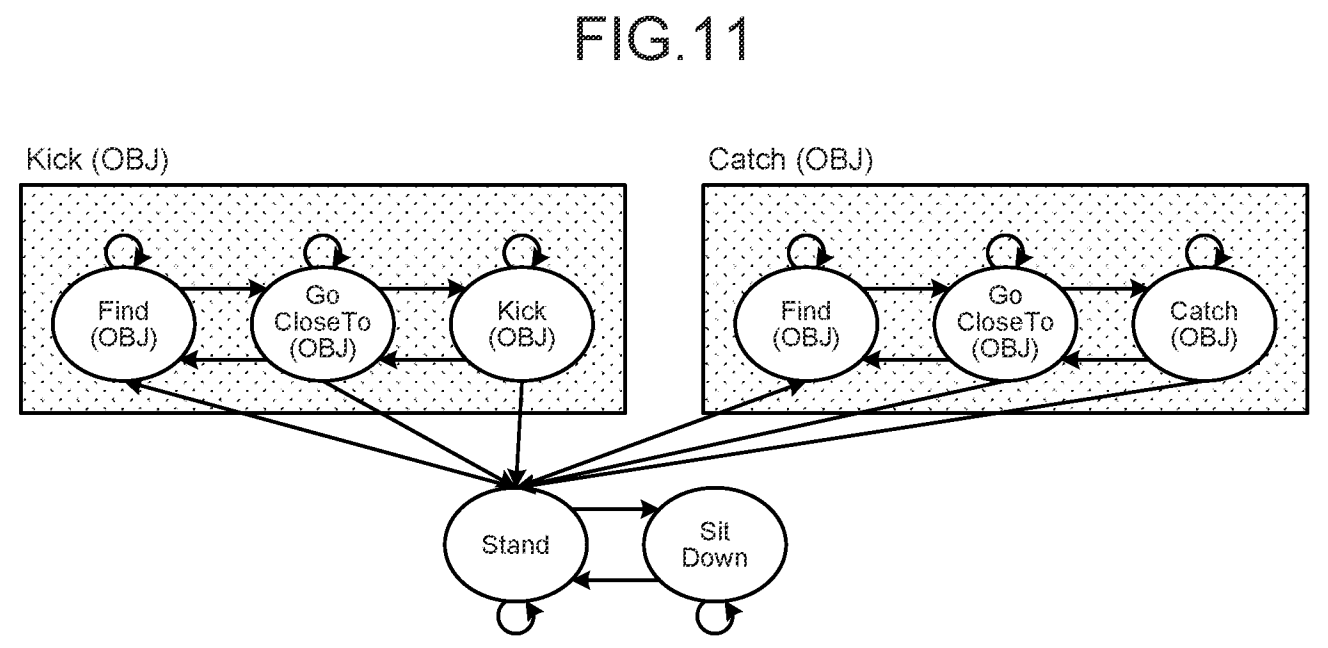

Next, an implementation example of the avatar controller 110 will be described. FIG. 11 is a state transition diagram of an example illustrating an example of a state transition for the avatar controller 110 to control the motion of the avatar body 120, which is applicable to the first embodiment.

In the example of FIG. 11, for the sake of explanation, a motion Kick (OBJ) and a motion Catch (OBJ) are defined as the motion of the avatar (avatar body 120). Note that OBJ is a variable, and an object to be an action target such as a ball or a box can be designated. The motion Kick (OBJ) indicates a motion of kicking the OBJ, and the motion Catch (OBJ) indicates a motion of receiving (catching) the OBJ. Furthermore, as the state of the avatar, a state Stand and a state Sit Down are defined.

The avatar controller 110 can transition each state to a state indicated by an arrow in FIG. 11. For example, the avatar controller 110 can transition from the state Stand to the state Sit Down. The avatar controller 110 executes a motion command (motion Kick (OBJ) or motion Catch (OBJ)) associated with an arrow and moves the limbs of the avatar at the time of transition from the state Stand to the state Sit Down.

One or more states are defined for each motion. In the example of FIG. 11, three states of a state Find (OBJ), a state Go Close To (OBJ), and a state Kick (OBJ) are defined for the motion Kick (OBJ). Further, in the motion Catch (OBJ), three states of a state Find (OBJ), a state Go Close To (OBJ), and a state Catch (OBJ) are defined.

The avatar controller 110 can transition each of these states to a state indicated by an arrow in FIG. 11. For example, in the motion Kick (OBJ), the avatar controller 110 can cause each state to transition in the order of the state Find (OBJ), the state Go Close To (OBJ), and the state Kick (OBJ), or in the reverse order of the order. In the avatar, each unit such as a hand, a foot, and a neck is operated with the transition of this state. Furthermore, the avatar controller 110 can make a transition from each of these states to the state Stand, further make a transition to the state Sit Down, and furthermore make a transition in the opposite direction.

Figure 12:
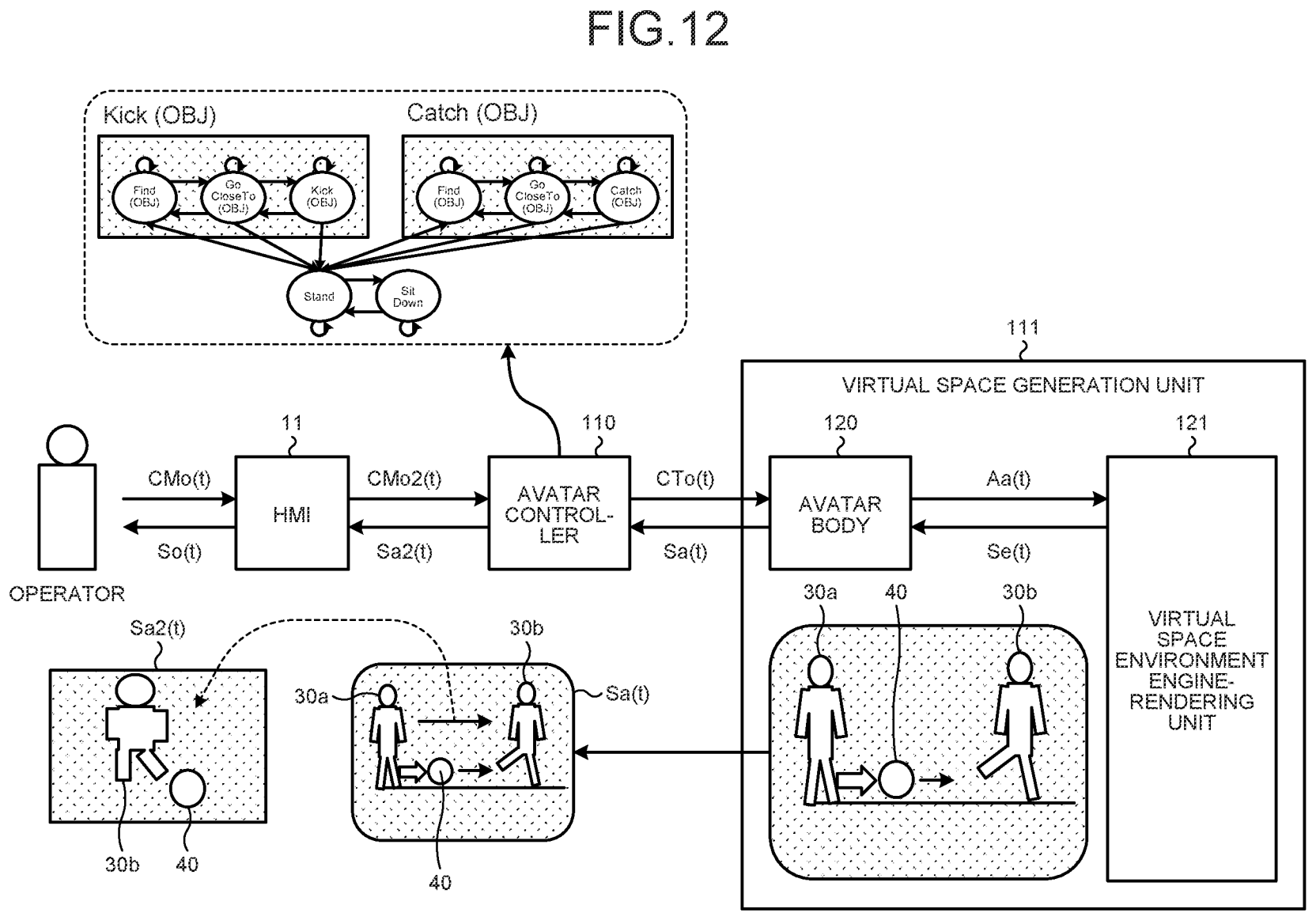

FIG. 12 is a schematic diagram for describing control of the avatar (avatar body 120) according to the first embodiment. In the upper left of FIG. 12, the state transition diagram of FIG. 11 is illustrated. The state transition illustrated in this state transition diagram is implemented in the avatar controller 110. The avatar controller 110 generates each state transition described above according to the command CMo2($t$) passed from the HMI 11. At that time, along with the state transition, the avatar controller 110 generates a command CTo(t) for moving the avatar body 120 on the basis of the direction of each arrow, and outputs the command CTo(t) to the avatar body 120.

As an example, it is considered a case where the avatar 30$a$ kicks and rolls the ball 40 toward the avatar 30$b$. The command Sa(t) passed from the avatar body 120 to the avatar controller 110 is data of the avatar 30$a$ and the entire environment including the avatar 30$a$. The avatar controller 110 converts the command Sa(t) into the command Sa2($t$) and passes the command Sa2($t$) to the HMI 11. The command Sa2($t$) indicates an image, a sound image, a tactile sense, and an external force viewed from the avatar 30$a$. The present invention is not limited thereto, and the command Sa2(t) may be an image, a sound image, a tactile sense, and an external force designated by the operator. In the example of FIG. 12, an image viewed from the avatar 30a according to the command Sa2(t) is illustrated, and the ball 40 that the player has kicked and rolled and the avatar 30b as the destination of the ball 40 are seen from the viewpoint of the avatar 30a.

2-4. Prediction Processing According to First Embodiment

Figure 13:
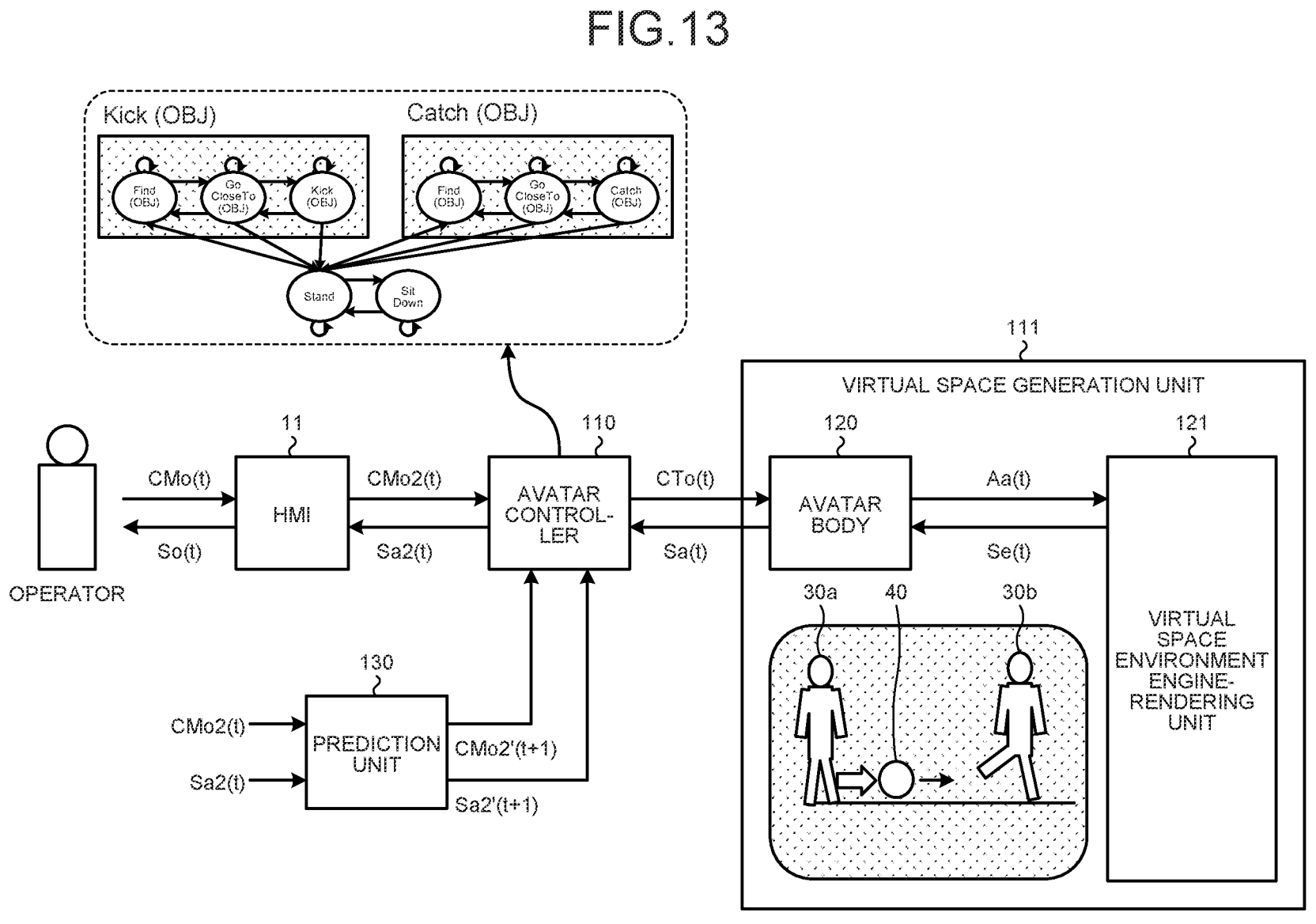

Next, prediction processing according to the first embodiment will be described. FIG. 13 is a schematic diagram for describing prediction processing according to the first embodiment.

In FIG. 13, a prediction unit 130 corresponds to, for example, the prediction unit 130 in FIG. 5, receives the commands CMo2(t) and Sa2(t) at a certain time t as inputs, predicts commands CMo2'(t+1) and Sa2'(t+1) at the next time t+1, and outputs the commands as prediction information. The prediction unit 130 passes these commands CMo2' (t+1) and Sa2'(t+1) as the prediction information to the avatar controller 110.

The prediction unit 130 can switch the commands CMo2' (t+1) and Sa2'(t+1) as the prediction information to the actual commands CMo2(t) and Sa2(t), or add the commands CMo2(t) and Sa2(t) at a predetermined ratio. Thus, the prediction unit 130 is controlled such that the prediction motion can be continued even if there is no input of the command CMo(t) from the operator.

Figure 14:
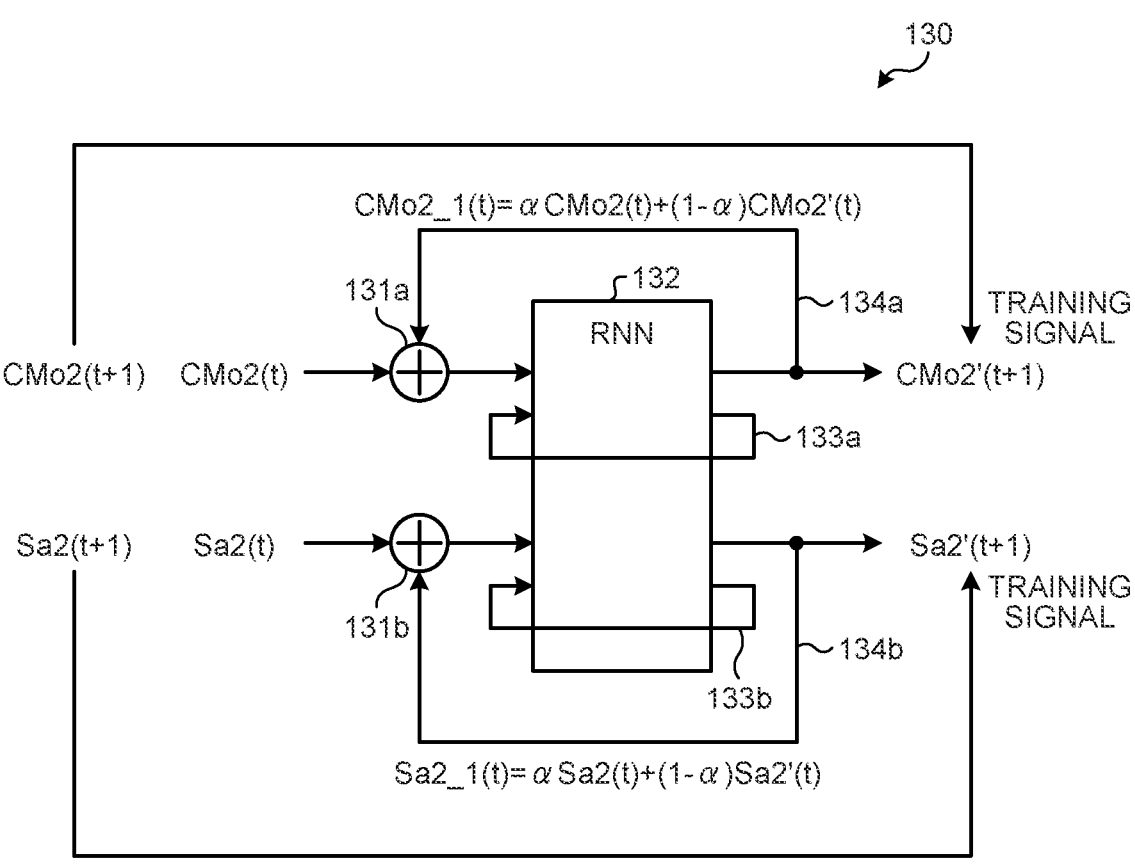
FIG. 14 is a block diagram illustrating a configuration of an example of a prediction unit according to the first embodiment.

Next, the prediction unit 130 will be described more specifically. FIG. 14 is a block diagram illustrating a configuration of an example of the prediction unit 130 according to the first embodiment.

In the example of FIG. 14, the prediction unit 130 according to the first embodiment is configured as a predictor by a Recurrent Neural Network (RNN) 132. The prediction unit 130 predicts the commands CMo2'(t+1) and Sa2' (t+1) at the time t+1 based on the commands CMo2(t) and Sa2(t) at the time t by inner loops 133a and 133b in the RNN 132. These predicted commands CMo2'(t+1) and Sa2'(t+1) are each used as a training signal in the RNN 132. The training signals are commands CMo2(t+1) and Sa2(t+1) actually input to the prediction unit 130 at time t+1.

As a learning method of the RNN 132, a method called backpropagation through time (BPTT) can be applied.

The input side of the RNN 132 may mix the actual command CMo2(t) and the command CMo2'(t) that is the predicted output by an adder 131a by an outer loop 134a outside the RNN 132. For example, a command CMo2_1(t) obtained by using a coefficient α of [0≤α≤1] and mixing the command CMo2(t) and the command CMo2'(t) at a predetermined ratio by the adder 131a is set as an input to the RNN 132 as expressed in the following Expression (1).

$$CMo2\_1(t)=\alpha \times CMo2(t)+(\alpha-1)\times CMo2'(t) \tag{1}$$

Similarly for the command Sa2(t), the command Sa2_1(t) obtained by mixing the actual command Sa2(t) and the command CMo2'(t) that is the prediction output by an adder 131b according to the following Expression (2) is set as an input to the RNN 132 by an outer loop 134b.

$$Sa2\_1(t)=\alpha \times Sa2(t)+(\alpha-1)\times Sa2'(t) \tag{2}$$

As described above, in the first embodiment, the output of the RNN 132 is added to the input of the prediction unit 130 at a predetermined ratio using the outer loops 134a and 134b, and is used as the input of the RNN 132. Thus, even if there is no input of actual information, the learned network can sequentially generate prediction information such as inputting its own prediction information to the RNN 132, further outputting a signal at the next time t+1, further inputting the signal, and outputting information at the time t+2.

Figure 15:
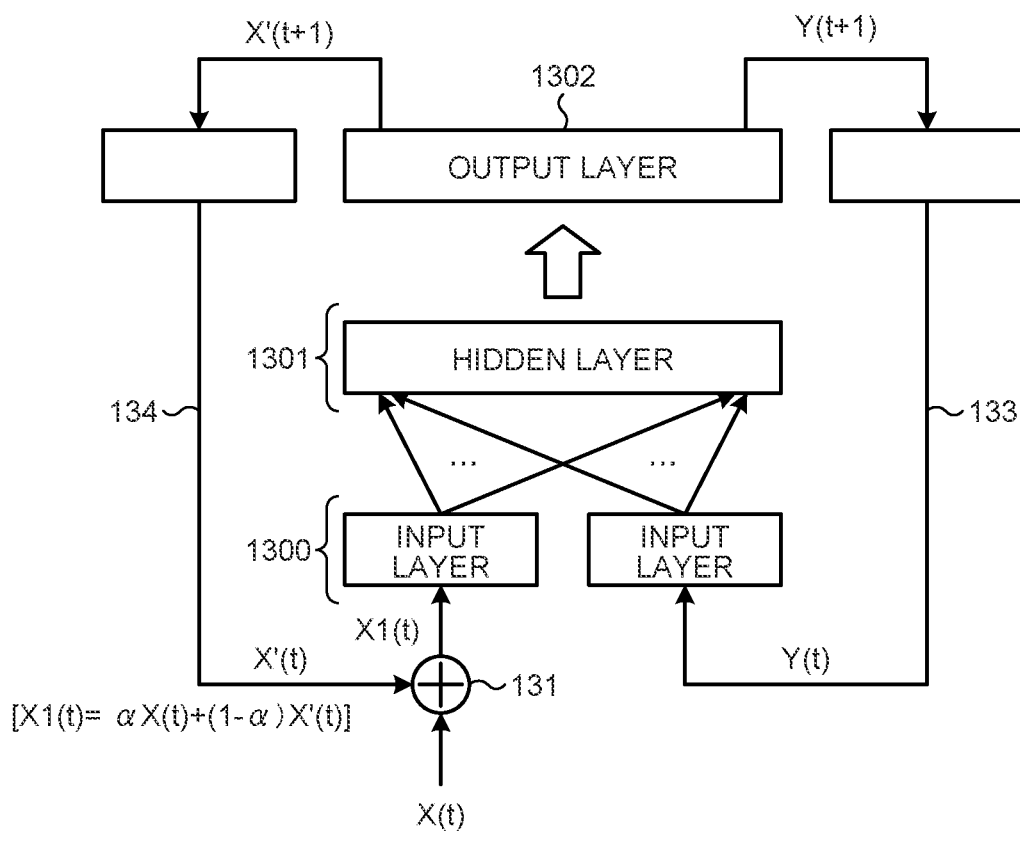
FIG. 15 is a schematic diagram illustrating an example of an internal configuration of an RNN according to the first embodiment.

FIG. 15 is a schematic diagram illustrating an example of an internal configuration of the RNN 132 according to the first embodiment illustrated in FIG. 14. Note that, in FIG. 15, only one of the system of the command CMo2(t) and the system of the command Sa2(t) illustrated in FIG. 14 is illustrated, and any information X(t) is assumed to be input. In FIG. 15, the RNN 132 includes an input layer 1300, a hidden layer 1301, and an output layer 1302.

The prediction learning by the RNN 132 basically predicts the state of the virtual world as a state X'(t+1) according to the following Expressions (3) and (4) when the state at the time t of the virtual world is X(t) and the context state is Y(t).

$$X'(t+1)=f(X(t),Y(t)) \tag{3}$$

$$Y(t+1)=g(X(t),Y(t)) \tag{4}$$

Since the state X(t+1) of the virtual world is observed at the time t+1, a supervised learning framework is applied by treating the state X(t+1) as a training signal of the predictor described above. Since the context Y(t) is not observed, learning is performed in a hidden state.

Furthermore, when learning proceeds to some extent, prediction errors decrease, and even if the input state X(t) does not exist, the prediction processing can be continued by operating the predictor as a self-loop using the inner loop 133. In the example of FIG. 15, an observation state X(t) and a prediction state X'(t) are added by an adder 131 on the basis of the coefficient α by the outer loop 134 as expressed in the following Expressions (5), (6), and (7) and used as actual inputs.

$$X'(t+1)=f(X1(t),Y(t)) \tag{5}$$

$$X1(t)=\alpha \times X'(t)+(1-\alpha)\times X(t) \tag{6}$$

$$Y(t+1)=g(X1(t),Y(t)) \tag{7}$$

In theory, as illustrated in FIG. 15, the above-described predictor can be achieved by the RNN 132 of three layers of the input layer 1300, the hidden layer 1301, and the output layer 1302, each of which is a single layer. Meanwhile, in consideration of convergence of learning and the like, a method of learning by further hierarchically configuring the structure of FIG. 15 has been proposed. For example, in the configuration of FIG. 15, it is conceivable that the hidden layer 1301 includes a plurality of layers.

Using the controller of the avatar acquired by such prediction learning, it is possible to autonomously control the avatar as if the control of the operator has been predicted.

2-5. Resolution of Contradiction According to First Embodiment

Next, resolution of a contradiction in a case where there is a contradiction between a predicted state and a state corresponding to an actual operation according to the first embodiment will be described. This corresponds to, for example, the processing of step S103 in the flowchart of FIG. 7.

First Example of Contradiction Resolution Method

First, a first example of a method for resolving a contradiction according to the first embodiment will be described.

Figure 16:
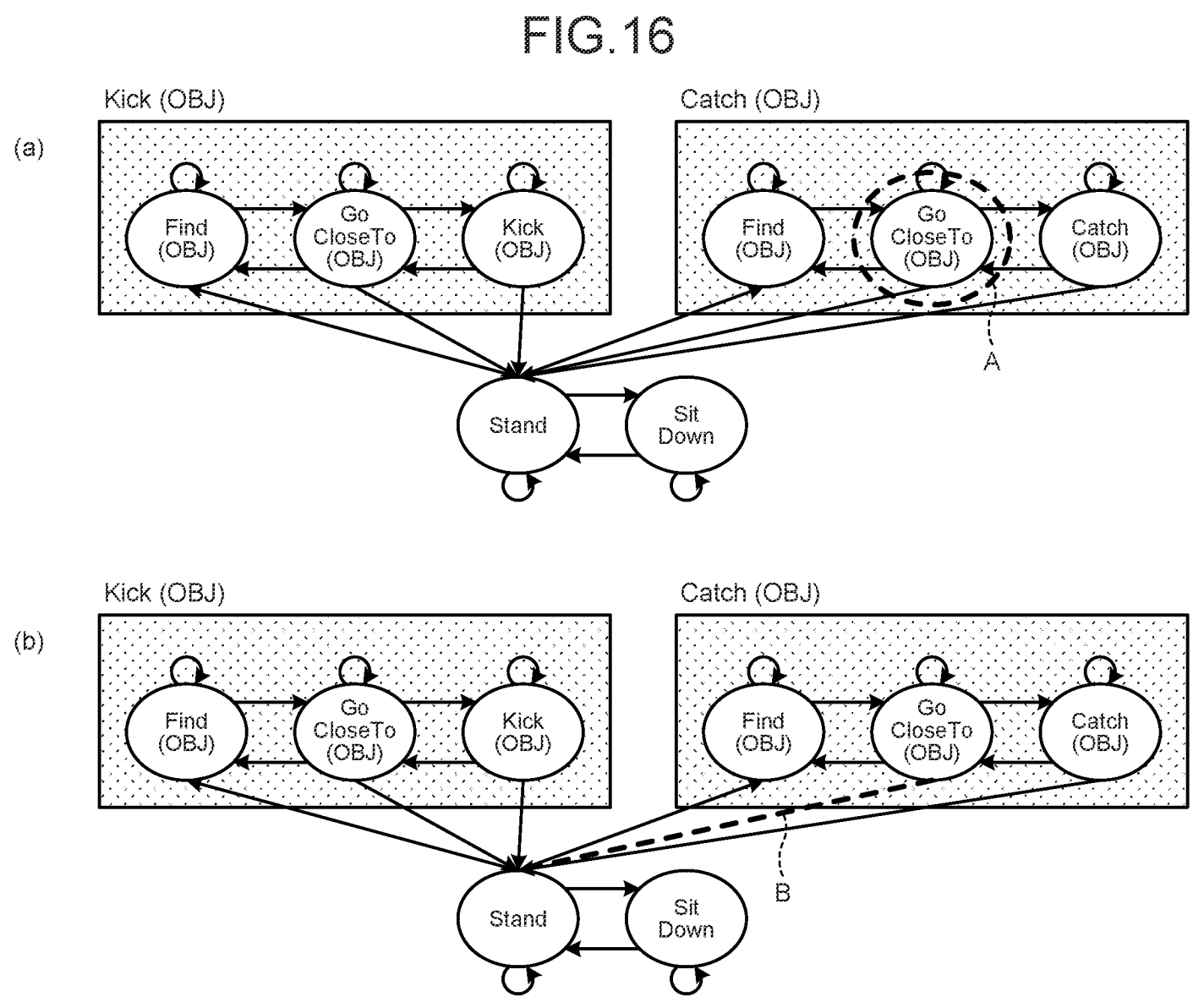

FIG. 16 is a diagram for describing the first example of the method for resolving a contradiction according to the first embodiment. The first example of the method for resolving the contradiction corresponds to the resolution method described with reference to FIG. 9.

For example, in the LVW #1, it is assumed that the operator A predicts that the avatar 30*b* operated by the operator B performs the motion of receiving the rolling ball 40 in response to the motion of kicking and rolling the ball 40 of the avatar 30*a* operated by the operator A. In this case, the local server 10*a* predicts that the avatar 30*b* in the LVW #1 takes the state Go Close To (OBJ) as indicated by symbol A in FIG. 16(*a*).

On the other hand, it is assumed that the operator B does not make an action on the ball 40 heading for the avatar 30*b* in VLW #2. In this case, the state of the avatar 30*b* remains in the state Stand. In this case, the prediction of the motion (state) of the avatar 30*b* in the local server 10*a* is different from the actual motion of the avatar 30*b* in the local server 10*b*, and there is a contradiction therebetween. Information indicating the state of the avatar 30*b* in the local server 10*b* is sent from the local server 10*b* to the local server 10*a*, for example, via the global server 20.

In this case, in the first example of the method for resolving the contradiction, the local server 10*a* sends a command to transition the state of the avatar 30*b* to the state Stand to the avatar controller 110 that controls the motion of the avatar 30*a*. The avatar controller 110 interrupts the state up to immediately before the avatar 30*b* (for example, a squatting state in order to pick up the ball 40), and shifts the state of the avatar 30*b* to a state (for example, the state Stand) for resolving the contradiction. More specifically, as indicated by an arrow B in section (b) of FIG. 16, the avatar controller 110 searches for a path for transitioning from the current state to the state Stand, and outputs an action for transitioning the state of the avatar 30*b* to the state Stand to the avatar body 120.

As described above, in the first example of the method for resolving the contradiction, in a case where there is a contradiction between the prediction of the state of the avatar 30*b* in the local server 10*a* and the state of the actual avatar 30*b* in the local server 10*b*, the state of the avatar 30*b* predicted in the local server 10*a* is transitioned to the actual state of the avatar 30*b* in the local server 10*b*. This makes it possible to resolve the contradiction.

Second Example of Contradiction Resolution Method

Figure 17:
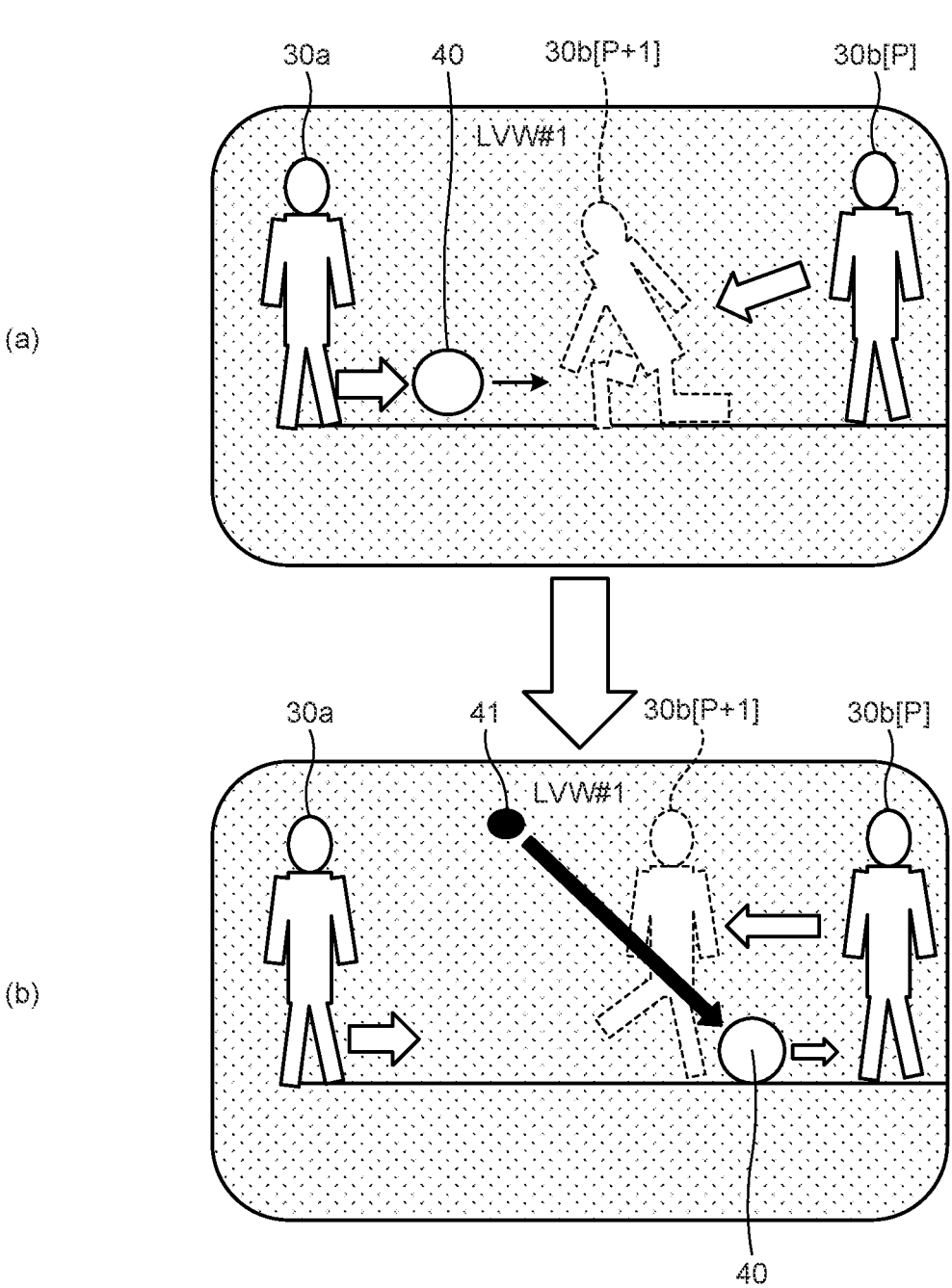
FIG. 17 is a diagram for describing a second example of the method for resolving a contradiction according to the first embodiment.

Next, a second example of a method for resolving a contradiction according to the first embodiment will be described. FIG. 17 is a diagram for describing the second example of the method for resolving a contradiction according to the first embodiment.

Section (a) in FIG. 17 illustrates a state corresponding to section (a) in FIG. 8 described above. That is, according to the operation by the operator A, the avatar 30*a* in the LVW #1 starts to roll the ball 40 toward the avatar 30*b* in the LVW #1. The local server 10*a* predicts that the avatar 30*b*[P] in a standing state will squat and pick up the ball 40 (avatar 30*b*[P+1]). On the other hand, in the local server 10*b*, the avatar 30*b*[P] in the LVW #2 takes an action of ignoring the ball 40 rolling toward the avatar 30*b* according to the operation by the operator B. For example, the avatar 30*b* in the LVW #2 moves towards the avatar 30*a*, but ignores the ball 40.

In accordance with the first example of the method for resolving the contradiction described above, for example, the local server 10*a* interrupts the state up to immediately before the avatar 30*b* (for example, the squatting state to pick up the ball 40), and transitions the state of the avatar 30*b* to the state for resolving the contradiction (for example, the state Stand).

In this case, it is considered a case where the avatar 30*b* in the state corresponding to the prediction result before transitioning to the state for resolving the contradiction has already picked up the ball 40 in the LVW #1. In this case, since the avatar 30*b* is in a state of rising by the state Stand, the contradiction regarding the state of the avatar 30*b* itself is resolved.

However, the ball 40 is picked by the avatar 30*b* before transitioning to the state Stand, and the movement stops. Originally, the avatar 30*b* does not perform the motion of picking up the ball 40, and thus the ball 40 should continue to roll a certain distance. Therefore, a contradiction occurs in the movement of the ball 40.

In the second example of the contradiction resolution method according to the first embodiment, in order to resolve this contradiction, a physical action is given to the ball 40 such that the ball 40 continues to roll. For example, as illustrated in section (b) of FIG. 17, the local server 10*a* causes an object 41 such as a stone to hit the ball 40 in the LVW #1, rolls the ball 40 by an action thereof, and moves the ball 40 to a place where it should originally be.

On the other hand, in the LVW #1, the avatar 30*b* moves from the avatar 30*b*[P] to the avatar 30*b*[P+1] from time[P] to time[P+1]. Therefore, the contradiction is resolved in each of the state of the avatar 30*b* and the state of the ball 40.

Note that, in the second example of the contradiction resolution method, the action on the ball 40 is not limited to hitting the object 41 such as a stone against the ball 40, and it is also conceivable that, for example, a bird is generated in the LVW #1 to cause the bird to pick up the ball 40. As described above, in the second example of the contradiction resolution method according to the first embodiment, in order to resolve the contradiction occurring in the LVW #1, a mechanism for resolving the contradiction is embedded in advance in the environment of the LVW #1. That is, in the second example of the contradiction resolution method according to the first embodiment, the environment of the LVW #1 is changed in order to resolve the contradiction occurring in the LVW #1.

As described above, the information processing system 1*a* according to the first embodiment of the present disclosure includes the global server 20 that presents the global virtual world (GVW) and the local servers 10*a* and 10*b* that present the local virtual worlds (the LVW #11 and the LVW #2) to the operators A and B, respectively. For example, the local server 10*a* is disposed at a position physically close to the HMI 11*a* operated by the operator A, and the local server 10*b* is disposed at a position physically close to the HMI 11*b* operated by the operator B. Therefore, calculation resources of the virtual space are distributed, and a delay in communication can be reduced.

Furthermore, in the information processing system 1*a* according to the first embodiment of the present disclosure, for example, the local server 10*a* predicts the motion (state) of the avatar B operated in another local server 10*b* corresponding to the action of the avatar A operated in the local server 10*a*. The local server 10*a* presents the motion of the avatar B in the LVW #1 based on the prediction result. Thus, it is possible to eliminate the delay until a reaction from the environment in the virtual world or another avatar to the operation by the operator returns.

Furthermore, the information processing system 1a according to the first embodiment of the present disclosure prepares a mechanism for resolving a contradiction in a case where the contradiction is detected between the prediction result regarding the avatar B in the local server 10a and the motion of the avatar B operated in the local server 10b. Therefore, it is possible to suppress an unnatural motion in a case where there is a contradiction in the prediction result.

3. Second Embodiment of Present Disclosure

Next, a second embodiment of the present disclosure will be described. In the first embodiment described above, the global server 20 detects the contradiction between the motion of the avatar by prediction and the motion of the avatar corresponding to the actual operation by the operator. In the second embodiment, this contradiction is detected by the local server 10.

Figure 18:
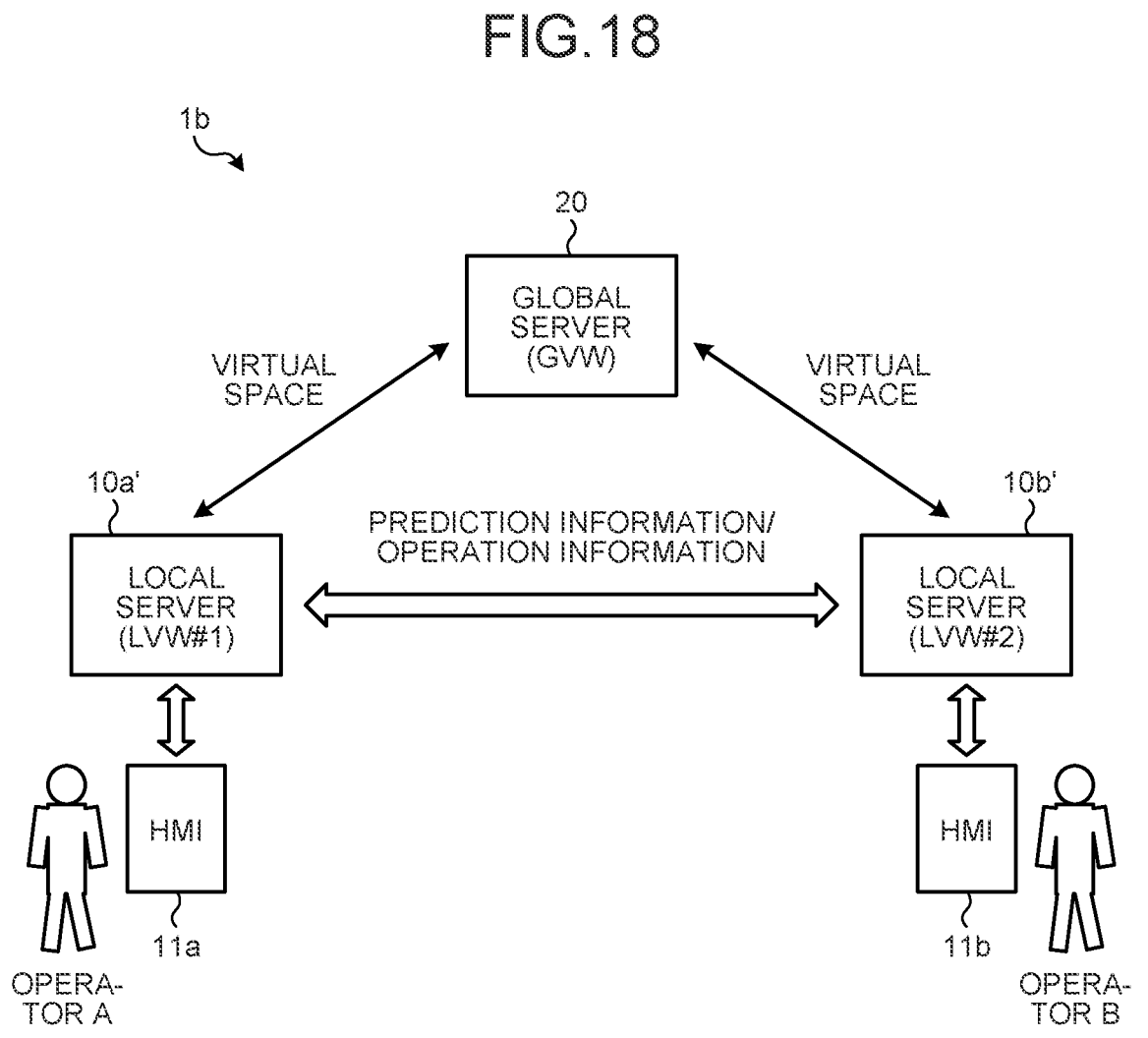

FIG. 18 is a schematic diagram illustrating a configuration of an example of an information processing system according to the second embodiment. In FIG. 18, an information processing system 1b according to the second embodiment includes a plurality of local servers 10a' and 10b' and the global server 20. The local servers 10a' and 10b' can communicate with each other via the network such as the Internet, which is not illustrated, and communicate with the global server 20.

In the information processing system 1b, the global server 20 provides the local servers 10a' and 10b' with, for example, a virtual world to be initial values of the LVW #1 and VLW #2. The present invention is not limited thereto, and in a case where each of the local servers 10a' and 10b' or at least one of them can provide the virtual world having the initial values, the global server 20 can be omitted. Note that, in the following description, in a case where it is not necessary to distinguish the local servers 10a' and 10b', the local servers 10a' and 10b' will be described as a representative of the local server 10'.

Figure 19:
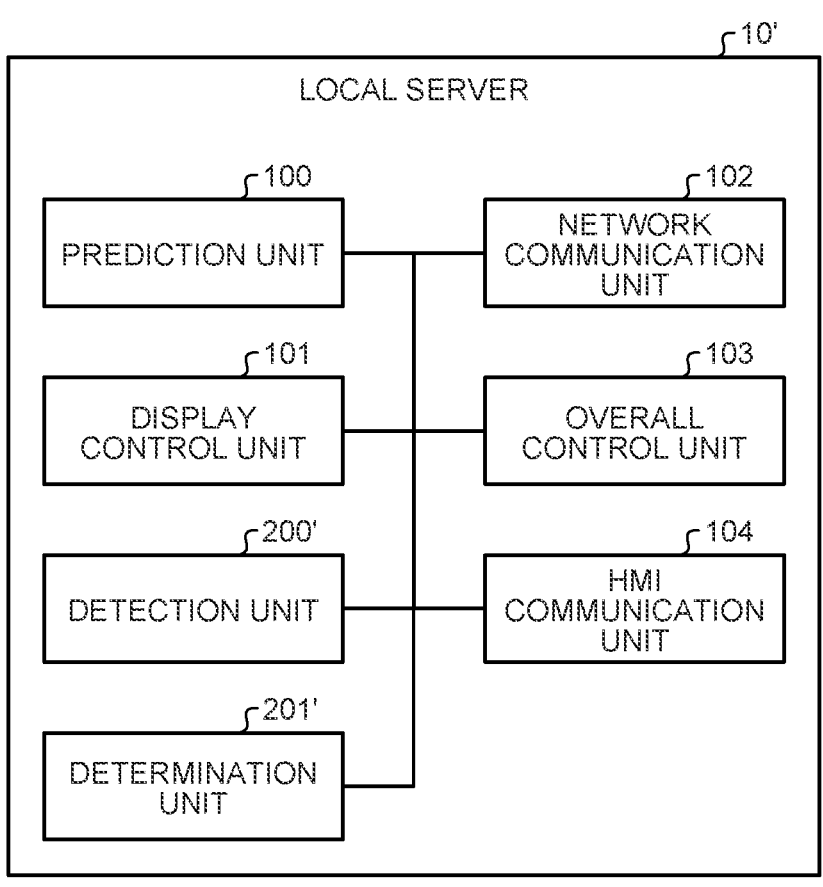
FIG. 19 is a functional block diagram of an example for describing functions of a local server according to the second embodiment.

FIG. 19 is a functional block diagram of an example for describing functions of the local server 10' according to the second embodiment. In FIG. 19, the local server 10' includes the prediction unit 100, the display control unit 101, the network communication unit 102, the overall control unit 103, the HMI communication unit 104, a detection unit 200', and a determination unit 201'. Since the configuration of the local server 10 described with reference to FIG. 3 can be applied as it is to the hardware configuration of the local server 10', the description thereof is omitted here.

The prediction unit 100, the display control unit 101, the network communication unit 102, the overall control unit 103, the HMI communication unit 104, the detection unit 200', and the determination unit 201' are configured by executing a program on the CPU 1000. Not limited to this, part or all of the prediction unit 100, the display control unit 101, the network communication unit 102, the overall control unit 103, the HMI communication unit 104, the detection unit 200', and the determination unit 201' may be configured by hardware circuits that operate in cooperation with each other.

Among these units, the prediction unit 100, the display control unit 101, the network communication unit 102, the overall control unit 103, and the HMI communication unit 104 have functions similar to those of the corresponding units described with reference to FIG. 5, and thus the detailed description thereof is omitted here.

In addition, the detection unit 200' and the determination unit 201' have functions similar to those of the detection unit 200 and the determination unit 201 in the global server 20 described with reference to FIG. 6, respectively, and thus the detailed description thereof is omitted here.

In such a configuration, for example, the local server 10a' transfers the operation information indicating the operation on the avatar 30a input to the HMI 11a by the operator A to the local server 10b'. At this time, the local server 10a' adds a first flag indicating that the operator A has performed an operation to the operation information, and transfers the operation information to the local server 10b'. Furthermore, for example, the local server 10a' predicts, by the prediction unit 100, the motion of the avatar 30b operated by the operator B in the local server 10b', and transfers prediction information indicating the prediction result to the local server 10b'. At this time, the local server 10a' adds a second flag indicating the prediction information to the prediction information and transfers the prediction information to the local server 10b'.

Similarly, the local server 10b' transfers the operation information and the prediction information to the local server 10a' by adding first and second flags indicating the operation information and the prediction information, respectively.

In a case where the information processing system 1b includes three or more local servers 10, the three or more local servers 10 each add the first and second flags indicating the operation information and the prediction information and transfer the operation information and the prediction information to each other.

For example, in the local server 10a', the detection unit 200' detects the presence or absence of contradiction in the motion of the avatar 30b on the basis of the operation information for operating the avatar 30b acquired from the local server 10b' by the network communication unit 102 and the prediction information obtained by predicting the motion of the avatar 30b by the prediction unit 100 in the local server 10a'. At this time, the detection unit 200' can identify the operation information and the prediction information on the basis of the first and second flags respectively added to the operation information and the prediction information. Thus, even in a case where the information processing system 1b includes three or more local servers 10, the detection unit 200' can detect a contradiction between the motion of the avatar 30b predicted in the local server 10a' and the motion of the avatar 30b actually operated by the operator in another local server 10.

As a method for resolving the contradiction in the local server 10a', the first method and the second method described in the first embodiment can be applied, and thus the description thereof is omitted here.

With the information processing system 1b corresponding to the second embodiment, similarly to the first embodiment described above, it is possible to detect and resolve a contradiction between the predicted motion of the avatar and the motion of the avatar corresponding to the actual operation without using the global server 20.

4. Third Embodiment of Present Disclosure

Next, a third embodiment of the present disclosure will be described. The third embodiment is an example in which the information processing system 1a or 1b according to the first embodiment or the second embodiment described above is applied to remote live. Hereinafter, a case where the information processing system 1a according to the first embodiment of the first embodiment and the second embodiment is applied to the information processing system according to the third embodiment will be described.

In the remote live, schematically, a stage as a virtual environment is provided in the virtual space, and the performer gives a performance such as singing on the stage provided in the virtual space by his or her own avatar. The user as an audience operates the terminal device to participate in this virtual space by his or her own avatar, and views the performance of the performer by the avatar from the avatar's viewpoint. Furthermore, avatars of other users can also exist in the virtual space, and each user can also appreciate avatars of other users from the viewpoint of his or her own avatar, and enjoy feeling as if he or she is in an actual concert venue.

In the remote live, the user does not need to go to a concert venue as in a real world concert. Furthermore, in the remote live, the performer can also create effects that would be difficult to achieve in the real world, and the user as an audience can also experience a stage that cannot be experienced in the real world through the avatar.

Figure 20:
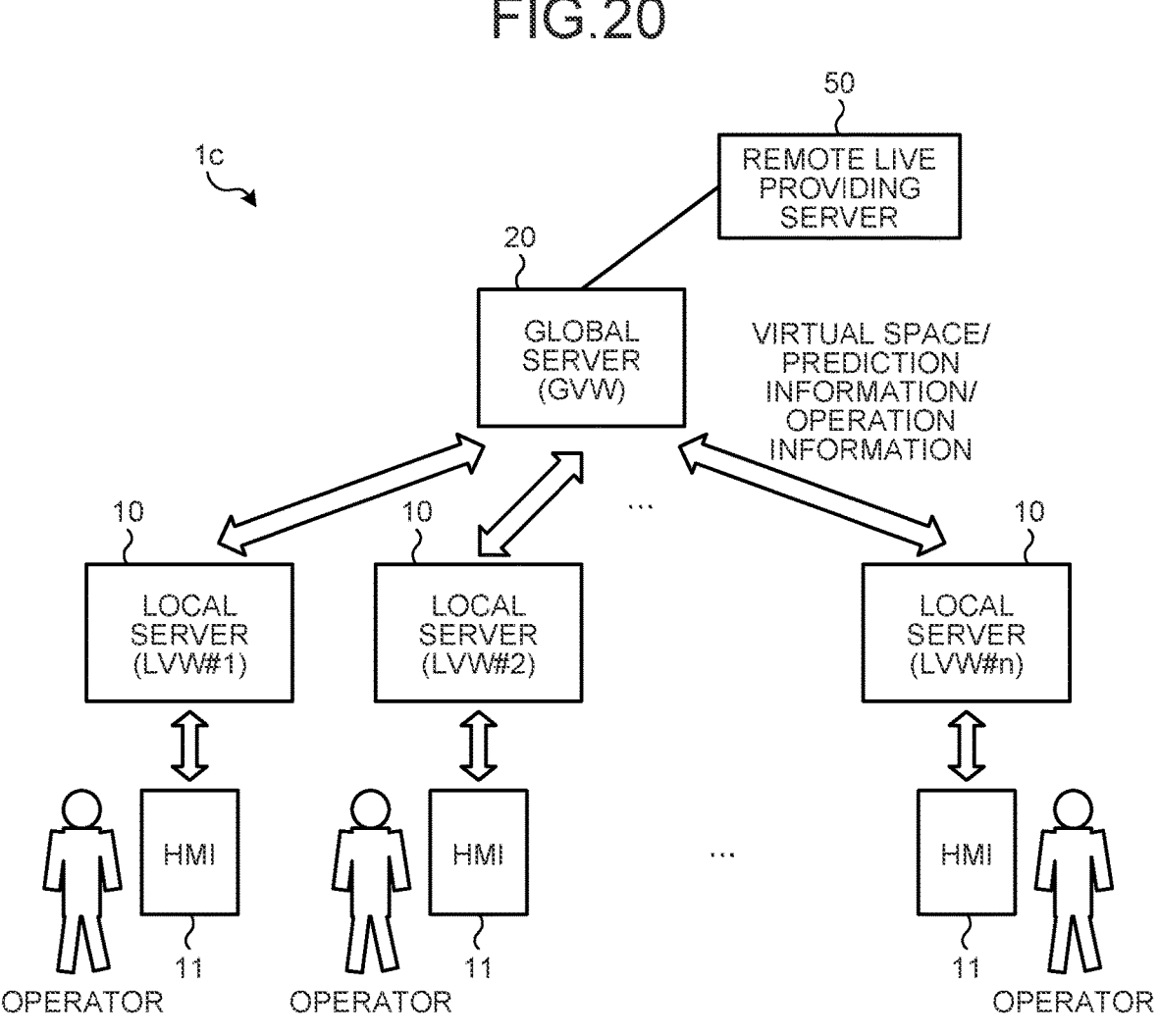
FIG. 20 is a schematic diagram illustrating a configuration of an example of an information processing system according to a third embodiment.

FIG. 20 is a schematic diagram illustrating a configuration of an example of an information processing system according to the third embodiment. In FIG. 20, an information processing system 1c includes the global server 20 and a large number of local servers 10 connected to the global server 20 via the network such as the Internet, which is not illustrated.

The information processing system 1c according to the third embodiment further includes a remote live providing server 50. The remote live providing server 50 provides a stage by the remote live as a virtual environment. For example, the remote live providing server 50 generates a virtual environment of the stage including a virtual stage, virtual devices (acoustic device, lighting device, and the like) and props installed on the stage, avatars of performers, acoustic information, and the like.

The processing in the global server 20 and each local server 10 is basically similar to the processing in the first embodiment described above. The global server 20 includes the virtual environment of the stage in the initial values of the virtual space transferred to each local server 10, and transfers the virtual space to each local server 10. The local servers 10 construct and draw the LVW #1, the LVW #2, . . . , and the LVW #n, respectively, on the basis of the initial values of the virtual environment transferred from the global server 20. Note that the remote live providing server 50 transfers the generated virtual environment of the stage to the global server 20 while updating the virtual environment according to the movement of the avatar of the performer, or the like. In response to this update, the global server 20 transfers the virtual space including the virtual environment of the updated stage to each of the local servers 10, and the local servers 10 update the LVW #11, the LVW #2, . . . , and the LVW #n, respectively, according to the transferred virtual environment.

Each operator connects to the local server 10 using the HMI 11, and participates in the LVW #1, the LVW #2, . . . , and the LVW #n, which are virtual spaces in the respective local servers, by each avatar. For example, the LVW #1 includes avatars corresponding to the local server 10 (hereinafter referred to as the local server 10 #1) that draws the LVW #1, and also includes each avatar participating from another local server 10. The same applies to the other LVW #2, . . . , and LVW #n.

Among the local servers 10, the local server 10 #1 that draws the LVW #1 will be described below as an example.

Furthermore, an avatar operated by an operator corresponding to the local server 10 #1 is referred to as an avatar #1.

Each local server 10 predicts an action of the avatar in another local server 10, and reflects the predicted action on the LVW in its own local server 10. For example, in the local server 10 #1 that draws the LVW #1, the corresponding operator can operate his or her own avatar #1 and dance by the avatar #1 in accordance with the performer's performance, for example.

Furthermore, the operator can transfer audio data based on his or her own voice to the local server 10 #1 by the audio device 1108 included in the HMI 11, and cause the avatar #1 to virtually reproduce the voice in the LVW #1. The sound transferred to the LVW #1 is also transferred to and reproduced by the other LVW #2, . . . , and LVW #n. The audio data may be audio data that is true to the operator's voice or may be audio data obtained by processing the operator's voice.

The local server 10 #1 predicts the action of each avatar by the other local server 10, and synchronizes the action of each avatar with the action of the avatar #1 operated by the operator of the local server 10 #1. Thus, the avatar #1 can sing and dance together with other avatars interactively in the LVW #1.

For example, in the local server 10 #1, there may be a case where the prediction of the action of each avatar by another local server 10 is wrong.

Here, if the local server 10 #1 performs prediction on the basis of determined lyrics and songs instead of interaction by the ad-lib of the operator regarding the songs, a situation in which the prediction is missed can be avoided. For example, the local server 10 #1 performs prediction by learning voice synthesis of the operator, how to take timing, how to give vibrato, the loudness (intonation) of voice, and the like. The dance is similarly predicted if it has a predetermined pattern.

On the other hand, in a case where the local server 10 #1 interactively executes the dance, when the prediction of the action of each avatar in another local server 10 is missed, the local server 10 #1 can resolve the contradiction by connecting and exchanging the predicted action and the action by the actual operation on each avatar in another local server 10 at a certain timing. After resolving the contradiction, the local server 10 #1 predicts the action of each avatar in another local server 10 again. As a timing at which the predicted action and the action based on the actual operation by each avatar are exchanged, a break of a bar of the song, a timing of modulation or a rhythm change, or the like can be considered.

Note that, regarding the song, for example, for a portion where the same phrase is repeated in a chorus part of the song or the like, the local server 10 #1 can resolve the contradiction in the same manner as described above.

As described above, in the information processing system 1c according to the third embodiment of the present disclosure, for example, the local server 10 #1 predicts the action of the avatar operated in another local server 10 corresponding to the action of the avatar #1 operated in the local server 10 #1. The local server 10 #1 presents an action of an action of an avatar operated in another local server 10 in the LVW #1 on the basis of the prediction result. Thus, it is possible to eliminate the delay until the reaction from the environment in the virtual world or another avatar to the operator's operation is returned, and the operator as an audience can enjoy the same realistic feeling as the live in the real space in the remote live.

Furthermore, the information processing system 1c according to the third embodiment of the present disclosure prepares a mechanism for resolving a contradiction in a case where the contradiction is detected between the prediction result regarding the avatar operated in another local server 10 in the local server 10 #1 and the motion of the avatar operated in the another local server 10, for example. Therefore, in a case where there is a contradiction in the prediction result, it is possible to prevent the realistic feeling from being impaired.

Note that the effects described in the present specification are merely examples and are not limited, and other effects may be provided.

Note that the present technology can also have the following configurations.

(1) An information processing apparatus, comprising:
a control unit that controls display of a first virtual space, wherein
the control unit
controls a motion of an avatar corresponding to a second operator displayed in the first virtual space on a basis of prediction information for predicting an operation by the second operator with respect to a second virtual space different from the first virtual space, the second virtual space corresponding to a terminal of the second operator.

(2) The information processing apparatus according to the above (1), wherein
the first virtual space corresponds to a terminal of a first operator.

(3) The information processing apparatus according to the above (1) or (2), further comprising:
a detection unit that detects a contradiction between a first motion of the avatar corresponding to an operation on the avatar by the second operator and a second motion of the avatar controlled on a basis of the prediction information in the first virtual space.

(4) The information processing apparatus according to the above (3), wherein
the control unit
controls the motion of the avatar in the first virtual space on a basis of an operation on the avatar by the second operator in a case where the contradiction is detected by the detection unit.

(5) The information processing apparatus according to the above (3) or (4), wherein
the control unit
causes a state of the avatar displayed in the first virtual space to transition to a state in which the contradiction is resolved in a case where the contradiction is detected by the detection unit.

(6) The information processing apparatus according to the above (5), wherein
the control unit
solves the contradiction by causing a state of the avatar to transition from a state of the second motion to a state of the first motion.

(7) The information processing apparatus according to the above (5) or (6), wherein
the control unit
solves the contradiction by changing a virtual environment in the first virtual space.

(8) The information processing apparatus according to any one of the above (1) to (7), wherein the control unit
generates the prediction information on a basis of learning information obtained by learning an operation by the second operator by machine learning.

(9) The information processing apparatus according to the above (8), wherein
the first virtual space corresponds to a terminal of a first operator,
the avatar is shared by the first virtual space and the second virtual space, and
the control unit
executes the machine learning using a Recurrent Neural Network (RNN) on an operation with respect to the first virtual space by the first operator and environment information of the first virtual space including the avatar, and generates the prediction information on a basis of a result of the machine learning.

(10) The information processing apparatus according to the above (9), wherein
the control unit
adds a result of the machine learning to input data of the machine learning at a predetermined ratio.

(11) The information processing apparatus according to any one of the above (1) to (10), wherein
the control unit
predicts an operation by the second operator on a basis of environment information of the first virtual space.

(12) The information processing apparatus according to any one of the above (1) to (11), wherein
the avatar is shared by the first virtual space and the second virtual space.

(13) The information processing apparatus according to any one of the above (1) to (12), wherein
operation information indicating an operation by the second operator is transmitted from a second local server that presents the second virtual space to a first local server that presents the first virtual space via a global server that transmits and receives data to and from a plurality of the control units.

(14) The information processing apparatus according to any one of the above (1) to (12), wherein
data is directly transmitted and received between a first local server that presents the first virtual space and a second local server that presents the second virtual space.

(15) An information processing method, comprising:
a control step of controlling display of a first virtual space, the control step being executed by a processor, wherein
the control step includes controlling a motion of an avatar corresponding to a second operator displayed in the first virtual space on a basis of prediction information for predicting an operation by the second operator with respect to a second virtual space different from the first virtual space, the second virtual space corresponding to the second operator.

(16) An information processing system, comprising:
a first server that presents a first virtual space based on a global virtual space;
a second server that presents a second virtual space based on the global virtual space; and
a third server that presents the global virtual space, wherein
the third server includes
a control unit that controls display of the first virtual space presented by the first server, and
the control unit controls a motion of an avatar corresponding to a second operator displayed in the first virtual space on a basis of prediction information for predicting an operation by the second operator with respect to the second virtual space corresponding to the second operator.

REFERENCE SIGNS LIST 1a, 1b, 1c, 500 INFORMATION PROCESSING SYSTEM
10, 10a, 10a', 10b, 10b' LOCAL SERVER
11, 11a, 11b HMI
20 GLOBAL SERVER
30a, 30b, 30b[P], 30b[P+1] AVATAR
40 BALL
41 OBJECT
50 REMOTE LIVE PROVIDING SERVER
100, 130 PREDICTION UNIT
101 DISPLAY CONTROL UNIT
110 AVATAR CONTROLLER
120 AVATAR BODY
121 VIRTUAL SPACE ENVIRONMENT ENGINE-RENDERING UNIT
131, 131a, 131b ADDER
132 RNN
133, 133a, 133b INNER LOOP
134, 134a, 134b OUTER LOOP
200, 200' DETECTION UNIT
201, 201' DETERMINATION UNIT
202 VIRTUAL ENVIRONMENT GENERATION UNIT
1105 DISPLAY DEVICE
1106 INPUT DEVICE
1107 HAPTICS DEVICE
1108 AUDIO DEVICE
1300 INPUT LAYER
1301 HIDDEN LAYER
1302 OUTPUT LAYER

The invention claimed is:

1. An information processing apparatus, comprising: circuitry configured to
    control display of a first virtual space corresponding to a viewpoint of a first operator, and
    control a motion of an avatar corresponding to a second operator displayed in the first virtual space based on prediction information for predicting an operation performed on the avatar by the second operator with respect to a second virtual space different from the first virtual space,
  wherein the second virtual space corresponds to a terminal of the second operator,
  wherein the prediction information is generated based on learning information obtained by learning the operation performed on the avatar by the second operator by machine learning,
  wherein the first virtual space corresponds to a terminal of the first operator,
  wherein the avatar is shared by the first virtual space and the second virtual space, and
  wherein the circuitry is further configured to
    execute the machine learning using a Recurrent Neural Network (RNN) on each operation with respect to the first virtual space by the first operator and environment information of the first virtual space including the avatar,
    generate the prediction information based on a result of the machine learning, and add the result of the machine learning to the input data of the machine learning at a predetermined ratio.

2. The information processing apparatus according to claim 1,
  wherein the viewpoint of the first operator corresponds to a terminal of the first operator.

3. The information processing apparatus according to claim 1,
  wherein the circuitry is further configured to detect a contradiction between a first motion of the avatar corresponding to the operation performed on the avatar by the second operator and a second motion of the avatar controlled based on the prediction information in the first virtual space.

4. The information processing apparatus according to claim 3,
  wherein the circuitry controls the motion of the avatar in the first virtual space based on an operation on the avatar by the second operator in a case where the contradiction is detected by the detection unit.

5. The information processing apparatus according to claim 3,
  wherein the circuitry causes a state of the avatar displayed in the first virtual space to transition to a state in which the contradiction is resolved in a case where the contradiction is detected by the detection unit.

6. The information processing apparatus according to claim 5,
  wherein the circuitry solves the contradiction by causing a state of the avatar to transition from a state of the second motion to a state of the first motion.

7. The information processing apparatus according to claim 5,
  wherein the circuitry solves the contradiction by changing a virtual environment in the first virtual space.

8. The information processing apparatus according to claim 1,
  wherein the circuitry predicts an operation by the second operator based on environment information of the first virtual space.

9. The information processing apparatus according to claim 1,
  wherein the avatar is configured to be shared by the first virtual space and the second virtual space.

10. The information processing apparatus according to claim 1,
  wherein operation information indicating an operation by the second operator is transmitted from a second local server that presents the second virtual space to a first local server that presents the first virtual space via a global server that transmits and receives data to and from the circuitry.

11. The information processing apparatus according to claim 1,
  wherein data is directly transmitted and received between a first local server configured to present the first virtual space and a second local server configured to present the second virtual space.

12. An information processing method, executed by a processor, the method comprising:
    controlling display of a first virtual space corresponding to a viewpoint of a first operator; and
    controlling a motion of an avatar corresponding to a second operator displayed in the first virtual space based on prediction information for predicting an operation by the second operator with respect to a second virtual space different from the first virtual space, wherein the second virtual space corresponds to the second operator, wherein the prediction information is generated based on learning information obtained by learning the operation performed on the avatar by the second operator by machine learning, wherein the first virtual space corresponds to a terminal of the first operator, wherein the avatar is shared by the first virtual space and the second virtual space, and wherein the method further comprises executing the machine learning using a Recurrent Neural Network (RNN) on each operation with respect to the first virtual space by the first operator and environment information of the first virtual space including the avatar, generating the prediction information based on a result of the machine learning, and adding the result of the machine learning to the input data of the machine learning at a predetermined ratio.

13. An information processing system, comprising:

a first server configured to present a first virtual space based on a viewpoint of a first operator within a global virtual space;

a second server configured to present a second virtual space based on the global virtual space; and a third server configured to present the global virtual space, wherein the third server includes circuitry configured to control display of the first virtual space presented by the first server, and control a motion of an avatar corresponding to a second operator displayed in the first virtual space based on prediction information for predicting an operation by the second operator with respect to the second virtual space corresponding to the second operator, wherein the prediction information is generated based on learning information obtained by learning the operation performed on the avatar by the second operator by machine learning, wherein the first virtual space corresponds to a terminal of the first operator, wherein the avatar is shared by the first virtual space and the second virtual space, and wherein the circuitry is further configured to execute the machine learning using a Recurrent Neural Network RNN) on each operation with respect to the first virtual space by the first operator and environment information of the first virtual space including the avatar, generate the prediction information based on a result of the machine learning, and add the result of the machine learning to the input data of the machine learning at a predetermined ratio.

\* \* \* \* \*